United States Patent [19]

Ely et al.

[11] Patent Number: 6,118,271

[45] Date of Patent: Sep. 12, 2000

[54] POSITION ENCODER USING SATURABLE REACTOR INTERACTING WITH MAGNETIC FIELDS VARYING WITH TIME AND WITH POSITION

[75] Inventors: David T. Ely; Andrew N. Dames, both of Cambridge; Edward G. Colby, Bishops Stortford, all of United Kingdom

[73] Assignee: Scientific Generics Limited, Cambridgeshire, United Kingdom

[21] Appl. No.: 09/051,724

[22] PCT Filed: Oct. 17, 1996

[86] PCT No.: PCT/GB96/02560

§ 371 Date: Apr. 17, 1998

§ 102(e) Date: Apr. 17, 1998

[87] PCT Pub. No.: WO97/14935

PCT Pub. Date: Apr. 24, 1997

[30] Foreign Application Priority Data

Oct. 17, 1995 [GB] United Kingdom .................... 9521360
Feb. 19, 1996 [GB] United Kingdom .................... 9603463
Mar. 15, 1996 [GB] United Kingdom .................... 9605498

[51] Int. Cl.[7] ................. G01D 5/20; G01B 7/30
[52] U.S. Cl. .............. 324/207.17; 324/207.24; 324/207.25; 340/870.33; 341/15
[58] Field of Search .................. 324/207.15–207.19, 324/207.24, 207.25, 173, 174, 253, 254; 340/870.33; 341/15

[56] References Cited

U.S. PATENT DOCUMENTS

| | | |
|---|---|---|
| 3,559,064 | 1/1971 | Grundy ..................................... 324/173 |
| 3,711,724 | 1/1973 | Uemura ................................ 324/165 X |
| 4,045,787 | 8/1977 | Sidor et al. ......................... 340/870.33 |
| 4,146,956 | 4/1979 | Fujiwara . |
| 4,156,223 | 5/1979 | Spindler .......................... 340/870.33 X |
| 4,525,670 | 6/1985 | Miyagawa et al. . |
| 4,639,667 | 1/1987 | Andresen ........................... 324/207.18 |
| 5,122,741 | 6/1992 | Ohsumi . |
| 5,199,178 | 4/1993 | Tong et al. . |
| 5,204,621 | 4/1993 | Hermann et al. . |
| 5,252,919 | 10/1993 | Uemura .............................. 324/207.25 |
| 5,270,648 | 12/1993 | Watson . |
| 5,742,160 | 4/1998 | Bergstedt et al. ............. 324/207.16 X |

FOREIGN PATENT DOCUMENTS

| | | |
|---|---|---|
| 0132422 | 1/1985 | European Pat. Off. . |
| 0191223 A2 | 8/1986 | European Pat. Off. . |
| 0254613 A1 | 1/1988 | European Pat. Off. . |
| 0176513 | 3/1989 | European Pat. Off. . |
| 2651367 | 8/1990 | France . |
| 24 10 864 | 9/1975 | Germany . |
| 3345804 A1 | 6/1985 | Germany . |
| 90 04 531 U | 8/1991 | Germany . |
| 7-170106 | 10/1995 | Japan . |
| 9-61192 | 3/1997 | Japan . |
| 2201786 | 9/1988 | United Kingdom . |

OTHER PUBLICATIONS

Primdahl, "Fluxgate Magnetometer," The Institute of Physics, E. Sci. Instrum., vol. 12, 1979, pp. 241–253.
Patents Abstract of Japan vol. 10, No. 50 (E–384), Feb. 27, 1986 & JP 60 206115 A (Toshiba KK), Oct. 17, 1985, see abstract.

Primary Examiner—Gerard Strecker
Attorney, Agent, or Firm—Nixon & Vanderhye P.C.

[57] ABSTRACT

A position encoder is provided for indicating the relative position between first and second relatively movable members. One of the members carries a multi-pole magnetic scale which generates a magnetic field whose magnitude and direction vary with position and the other member carries at least one sense conductor. A saturable magnetic element is located in the positionally varying magnetic field of the magnetic scale and an excitation winding is provided which, when energized, generates a magnetic filed which interacts with the positionally varying magnetic field to cause different portions of the saturable magnetic element to saturate and desaturate at different times. The arrangement of the sense conductor is such that as the magnetic element is driven into and out of saturation, it outputs a signal which is indicative of the position of the magnetic scale relative to the sense conductor.

61 Claims, 19 Drawing Sheets

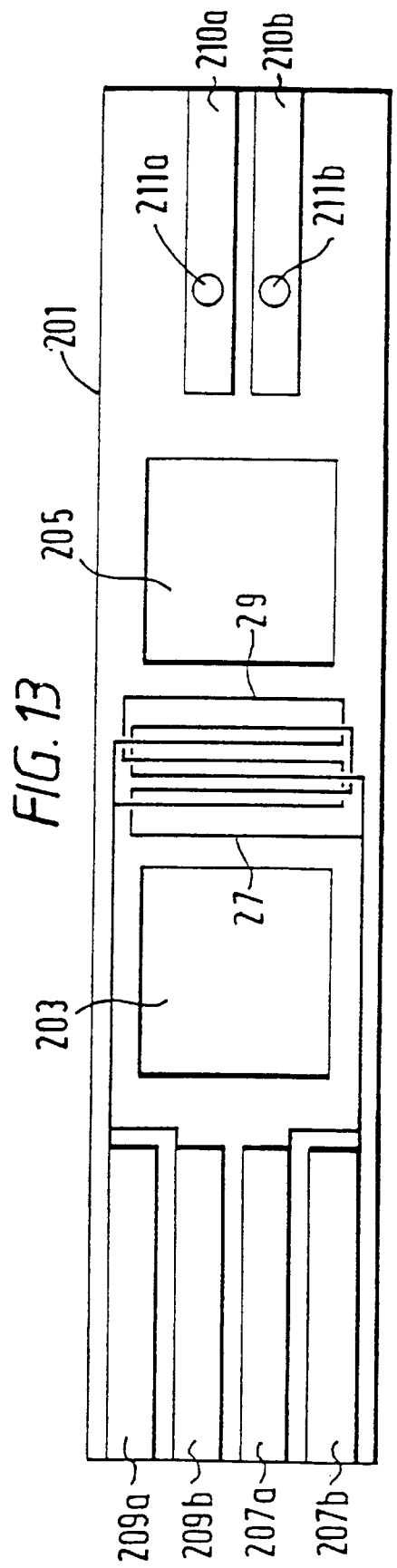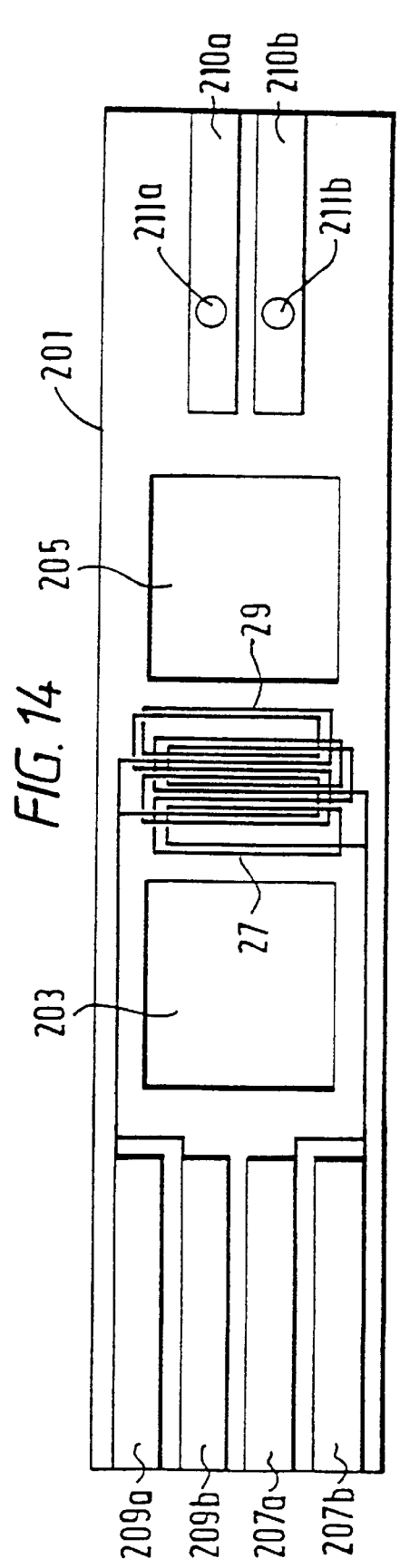

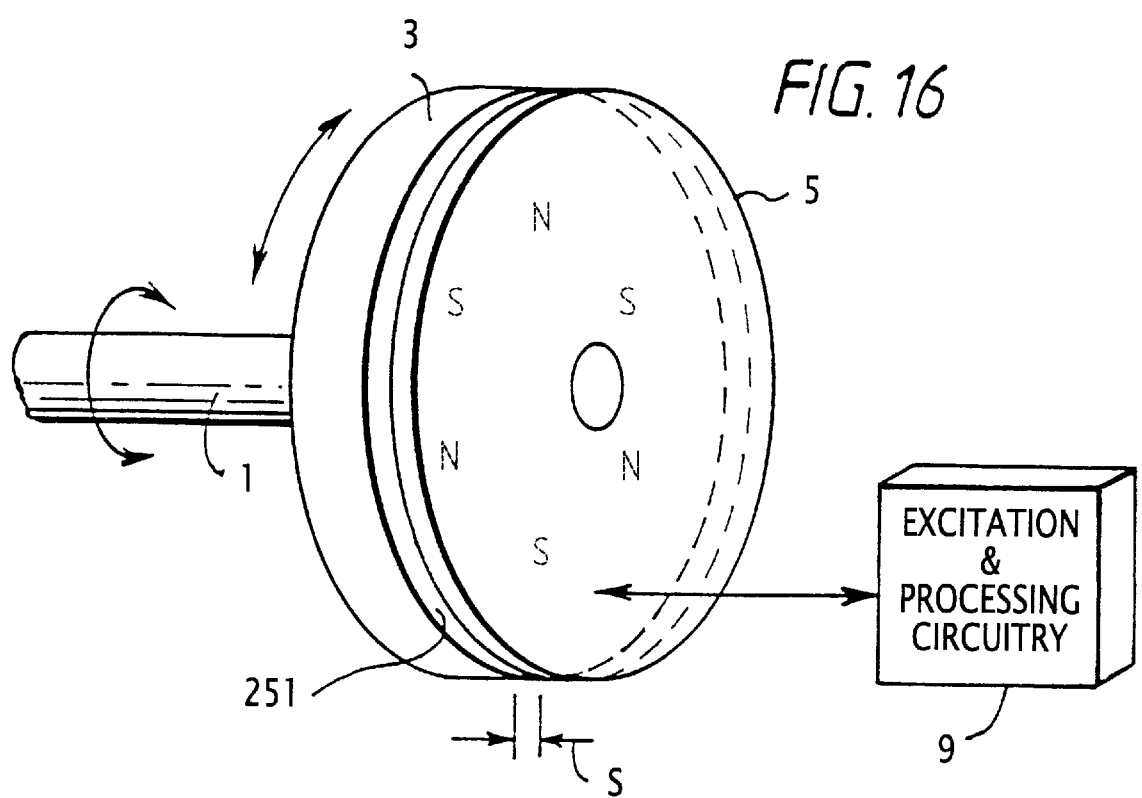

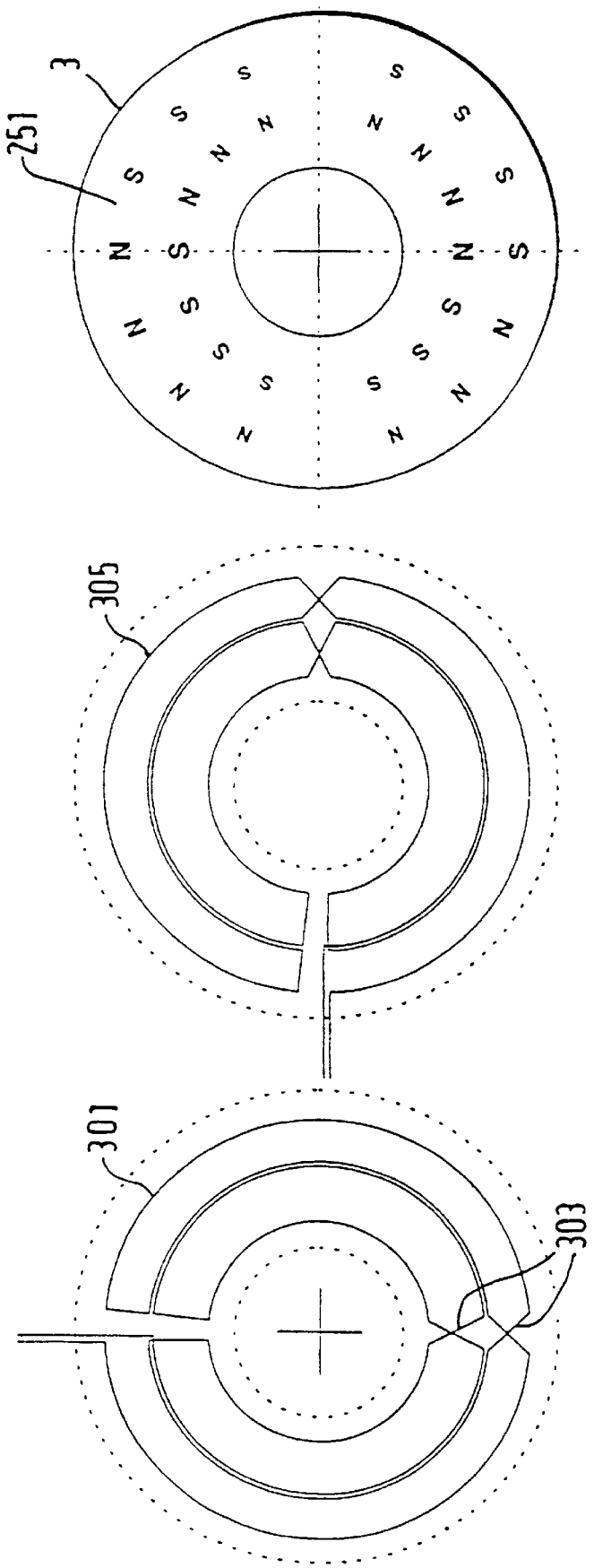

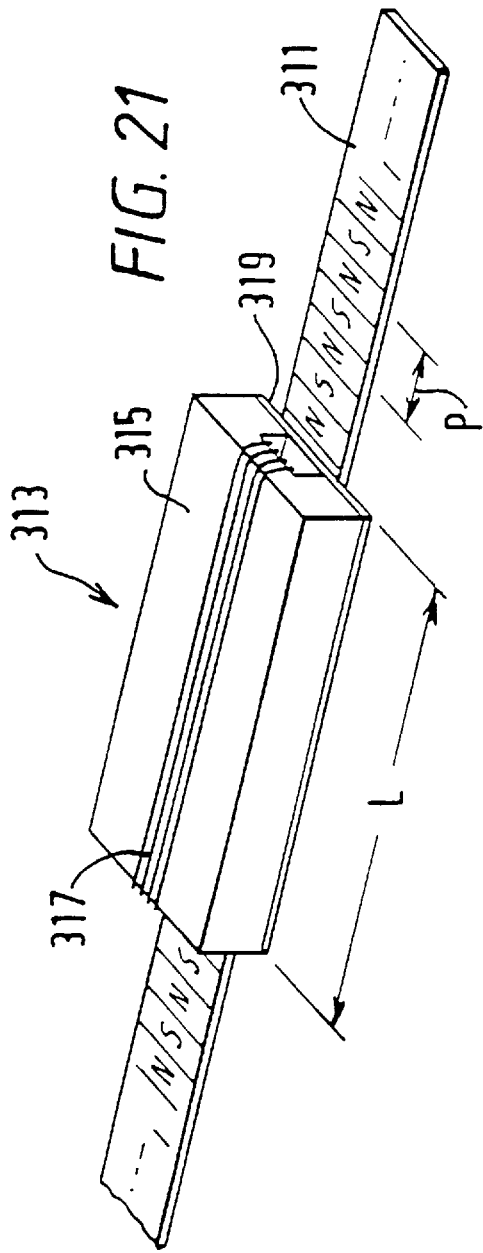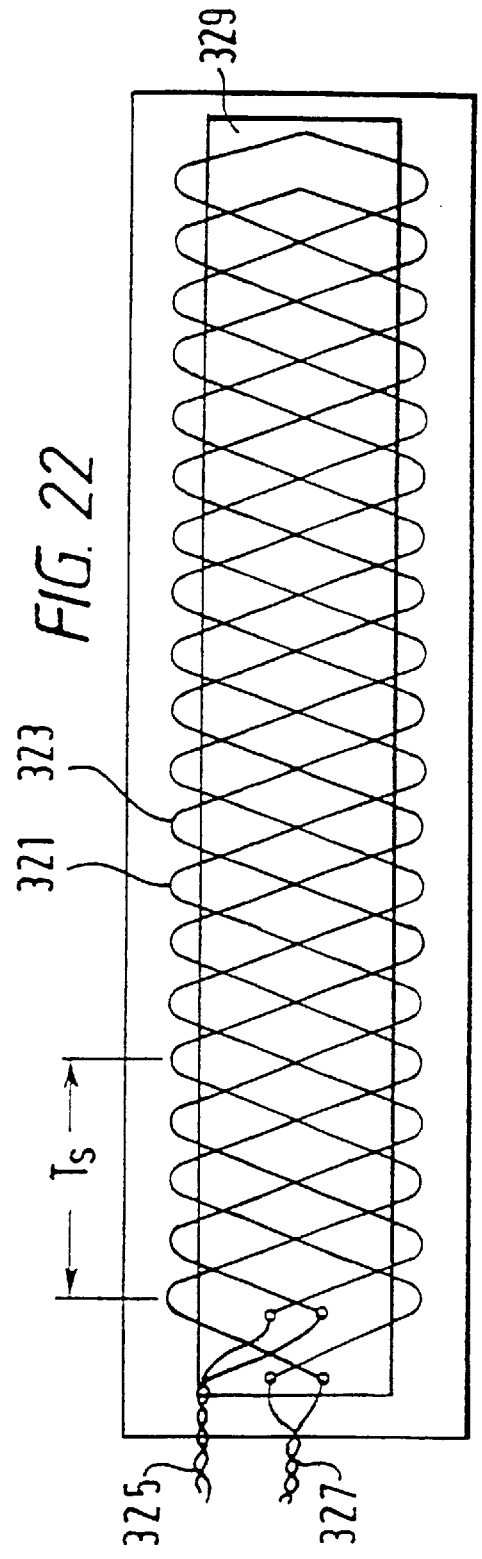

POSITION ENCODER USING SATURABLE REACTOR INTERACTING WITH MAGNETIC FIELDS VARYING WITH TIME AND WITH POSITION

FIELD OF THE INVENTION

The present invention relates to position encoders generally. The invention has particular but not exclusive relevance to non-contact rotary and linear position encoders. Some embodiments of the invention are suitable for use in relatively small systems which operate at relatively high temperatures and in which there may be magnetic and electromagnetic interference. Other embodiments are suitable for use in systems having a large measurement range which require a sensor head which is relatively insensitive to vibrations, mechanical misalignments and dirt, grease and the like.

DISCUSSION OF THE PRIOR ART

Position encoders are well known in the art and typically comprise a movable member, whose position is related to the machine about which position or motion information is desired, and a stationary member which is coupled to the moving member either optically, capacitively or magnetically. The stationary member includes a number of detectors which provide electrical output signals which can be processed to provide an indication of the position, direction, speed and/or acceleration of the movable member and hence those for the related machine.

One example of this kind of prior art encoder is one which uses a number of Hall effect detectors to detect magnetic features on the movable member, from which positional information can be derived.

As those skilled in the art know, a Hall effect detector detects the magnetic field at a point and consequently, in order to determine position unambiguously between each magnetic feature, at least two Hall effect detectors must be provided. Further, each Hall effect detector is likely to have a different non-zero DC offset (i.e. the output from the detector when there is no external magnetic field) resulting in a positional error in the output signals. Additionally, since several (typically 2 or more) Hall effect detectors are used to determine the positional information, this type of encoder is relatively expensive to manufacture.

Another disadvantage of the Hall effect encoder is that when it is used in a system where the spacing between the magnetic features on the rotating member is small (i.e. about 2 mm), the Hall effect detector s sensitivity to the magnetic features on the movable member is severely reduced due to its packaging. Typically, the packaging is plastic or ceramic and is used to avoid piezoelectric effects, to prevent contamination and to facilitate the provision of output leads. The inventors have established, by experimentation, that the magnetic field strength at the active surface of the Hall effect detector is attenuated by a factor of about 500 when the packaging has a thickness of 1 mm and when the magnetic features comprise a continuous series of alternating north and south magnetic poles having a pitch of 1 mm. The practical limit for the packaging thickness is approximately 0.5 mm, and even at this thickness the magnetic field strength is attenuated by a factor of about 25.

Yet another problem with Hall effect encoders is that they are sensitive to external electromagnetic interference. In particular, the Hall effect detector is sensitive to magnetic fields from nearby magnets and to the earth's magnetic field.

Another type of magnetic detector currently being used is the magnetoresistive detector, which has an active element whose resistance changes in dependence upon the external magnetic field. However, this type of detector suffers from poor temperature performance (practical magnetoresistive technology being limited to operation at or below about 80° C.) and either need to be precisely installed as part of the encoder assembly or require magnetic biassing and bridge circuitry (for detecting the change in resistance of the element) which requires accurate sensor matching.

A third type of magnetic detector which is currently being used in position encoders is the reluctance detector. This detector has a number of sense windings which are arranged to detect the changing magnetic field which occurs in their vicinity due to the movement of the magnetic features on the movable member. This type of detector can operate over a large range of temperatures. However, it is unable to sense the position of the movable member when it is stationary, since the magnetic features are not moving, and therefore, no signals are induced in the sense windings.

Optical detectors offer some advantages over the above magnetic detectors, in that travelling wave radiation may be focused thereby allowing high performance and positional resolution. Additionally, the optical detector may be completely shielded from external interference. However, the optical detector is not capable of operation above approximately 85° C. and is not suitable in applications where there is likely to be significant levels of dirt and/or grease.

The limitations of the above prior art encoders make them unsuitable for use in some applications. For example, in the case of a rotary encoder integrated with a small bearing (diameter less than 30 mm), the detector must be able to operate reliably and accurately throughout the operative temperature range of the bearing (which can be typically up to 200° C.).

EP-0191223 discloses a rotary encoder which uses a magnetic detector which is about 1.5 cm in length and which can operate in temperatures up to about 190° C. The detector uses a flux gate to detect the magnetic features on the rotating member. Flux gates per se are well known in the art and are usually used to detect weak magnetic fields at a great distance, such as for the detection of the earth's magnetic field. Typically, a flux gate comprises a magnetically permeable core, in which a magnetic flux is induced by the passage of an alternating excitation current through an excitation coil wound around the core. The interaction of the induced flux with the field flux being detected induces, in a sense coil wound around the core, an alternating output current whose frequency is twice that of the excitation current, and whose amplitude is modulated in dependence upon the strength of the field flux-being detected.

In the device described in EP-0191223, the magnetic features on the rotating member comprise a continuous series of alternating north (N) and south (S) magnetic poles and two flux gates are provided adjacent different portions of the rotating member to provide phase quadrature output signals.

Although the system described in EP-0191233 can operate at high temperatures, it has a number of significant disadvantages. In particular, i) the magnetically permeable core of each flux gate has two intricately manufactured pole pieces having spaced teeth which match the spacing of the N and S poles on the rotating element, thereby making the device expensive to manufacture; ii) the flux gates are sensitive to the earth's magnetic field and to other electromagnetic interference which corrupts the output signals; and iii) in order to obtain output signals which are in phase quadrature, the two flux gates must be accurately aligned relative to each other.

Many types of non-contact linear position sensors have been proposed. One such system is a magnetic system which detects the mutual inductance between an excitation winding mounted on one of the movable member and the stationary member and sense windings mounted on the other. However, this system suffers from the disadvantage of requiring connection leads to both the stationary member and the moving member. Additionally, in a system having a long encoding length, long lengths of sense windings are required which are relatively expensive and difficult to manufacture.

SUMMARY OF THE INVENTION

In one aspect, the invention provides an apparatus for generating a signal indicative of the relative position of first and second relatively movable members, comprising: means carried by one of said members, for generating a magnetic field whose strength varies with position; a saturable magnetic element; drive means for generating a magnetic field which varies with time and which interacts with said positionally varying magnetic field to cause different portions of the element to saturate and/or unsaturate at different times; and at least one sense conductor carried on the other one of said members arranged such that as the element is driven into and/or out of saturation, each sense conductor outputs a signal which is dependent upon the relative position between said first and second members.

Advantageously, the member which carries said sense conductor also carries said magnetic element and said drive means, and arranged such that the sense conductor and the drive means are located adjacent one side of the magnetic element and the means for generating the positionally varying magnetic field is adjacent the other side of the magnetic element. This arrangement permits the saturable magnetic element to be located as close as possible to the means for generating the positionally varying magnetic field, which is preferably a magnetic scale comprising a continuous alternating series of north and south poles, as this is cheap and easy to manufacture. In a preferred form of the apparatus according to this aspect, each sense conductor comprises at least two loops of conductor connected in series in a figure of eight arrangement, since this results in the sense conductors being relatively immune to electromagnetic interference.

In another aspect, the invention provides an apparatus for generating a signal indicative of the relative position of first and second relatively movable members, comprising: means carried by one of said members, for generating a magnetic field whose strength alternates in sense with position; a saturable magnetic element; drive means for generating a magnetic field which varies with time and which, in use, interacts with said positionally varying magnetic field to cause different portions of the element to saturate and/or unsaturate at different times; and at least one sense conductor which is sensitive to the positionally varying magnetic field such that as the magnetic element is driven into and/or out of saturation, the sense conductor outputs a signal indicative of the relative position between the first and second members.

Another aspect of the invention provides an apparatus for generating a signal indicative of the relative position of first and second relatively movable members, comprising: means carried by one of the members, for generating a magnetic field whose strength varies with position; a saturable magnetic element; drive means for generating a magnetic field which varies with time and which interacts with said positionally varying magnetic field to cause different portions of the element to saturate and/or unsaturate at different times; and at least one sense conductor arranged to detect magnetic flux which is expelled from a localised area of the magnetic element, such that as the element is driven into and/or out of saturation, the sense conductor outputs a signal indicative of the relative position between said first and second members.

According to a further aspect, the invention provides a method of writing a continuous sequence of alternating magnetic north and south poles around a generally cylindrical member, comprising the steps of: applying and alternating current to a magnetic recording head; rotating the cylindrical member about its axis in synchronism with the alternating current applied to the recording head, such that the magnetic north and the magnetic south poles are written to the desired positions, wherein the peak amplitude of the current applied to the recording head is smoothly increased from zero at time $t_0$ to $I_{max}$ at time $t_1$, is then maintained at $I_{max}$ until time $t_2$ and is then smoothly decreased to zero time $t_3$, and wherein between times $t_0$ and $t_1$, between times $t_1$ and $t_2$ and between times $t_2$ and $t_3$, said cylindrical member completes a single revolution about its axis and the number of cycles of said writing current equals the desired number of magnetic north and magnetic south poles to be written onto the cylindrical member.

BRIEF DESCRIPTION OF THE DRAWINGS

Exemplary embodiments of the invention will now be described with reference to the accompanying drawings, in which:

FIG. 12b shows the top layer of the printed circuit board design shown in FIG. 12a;

FIG. 12c shows the bottom layer of the printed circuit board design shown in FIG. 12a;

FIG. 13 illustrates a ceramic substrate on which the sense coils of the sensor head shown in FIG. 2 can be mounted as printed thick-film conductors on the ceramic substrate.

FIG. 14 illustrates a modification of the sense coils shown in FIG. 12, wherein two turns of printed conductors are used for each sense coil of the sensor head;

FIG. 16 schematically illustrates a rotatable shaft having a magnetizable encoder ring and a position encoder according to a second embodiment of the present invention;

FIG. 17b shows a top layer of printed conductors forming part of the printed circuit board shown in FIG. 17a;

FIG. 17c shows the bottom layer of printed conductors forming part of printed circuit board shown in FIG. 17a;

FIG. 20a schematically illustrates the form of a first sense coil on a sensor head for use with a 360° rotary encoder embodying the present invention;

FIG. 20b schematically illustrates the form of a second sense coil on the sensor head of the 360° rotary encoder embodying the present invention;

FIG. 20c schematically illustrates the magnetization pattern on the encoder ring for use with the sense coils shown in FIGS. 20a and b in the 360° rotary encoder;

FIG. 21 schematically illustrates a linear position encoder embodying the present invention;

FIG. 22 schematically illustrates the form of the sense windings formed on a printed circuit board used in the linear position encoder shown in FIG. 21;

DETAILED DESCRIPTION OF EXEMPLARY EMBODIMENTS

Figure 1:
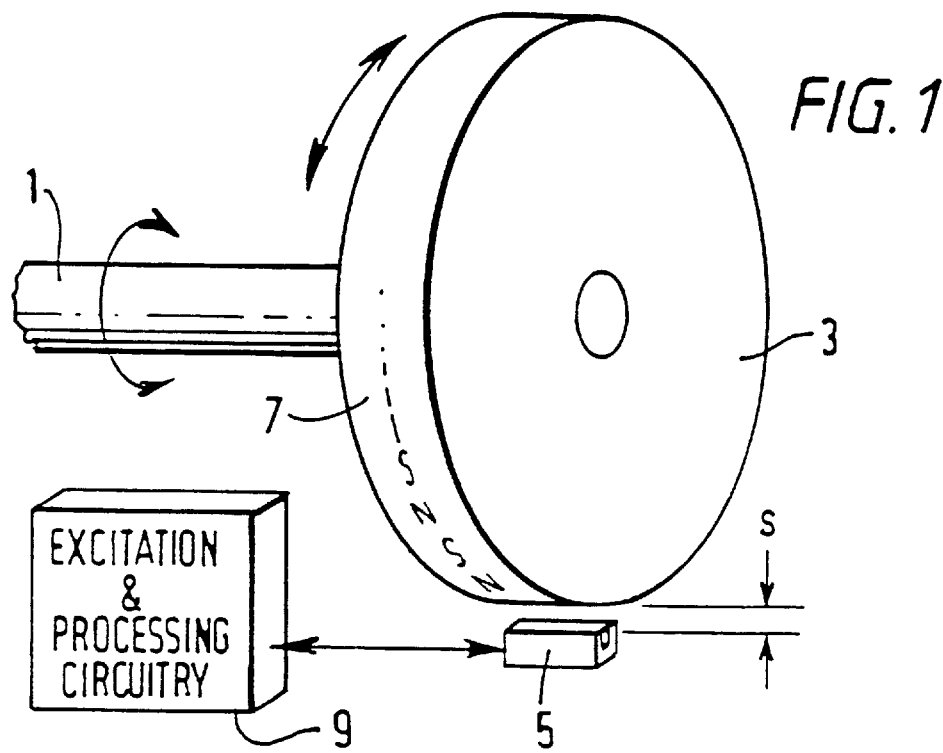
FIG. 1 schematically illustrates a rotatable shaft having a magnetizable encoder ring and a position encoder embodying the present invention.

FIG. 1 schematically shows a shaft 1 which is rotatable about its axis, having at an end thereof a magnetizable encoder ring 3 which rotates with the shaft 1. Also shown in FIG. 1 is a sensor unit 5 provided adjacent (at a distance S) to the circumferential edge 7 of the encoder ring 3. In this embodiment, the encoder ring 3 is made of a ferrite loaded plastic material which is cheap and easy to manufacture, and a continuous series of alternating north (N) and south (S) magnetic poles is recorded around it's circumferential edge 7. In this embodiment, the magnetic flux density at the surface of the circumferential edge is 0.2 Tesla and 64 N poles and 64 S poles are recorded at a pitch (the distance between adjacent N poles or between adjacent S poles) of 1 mm. To work effectively, the separation distance S. between the sensor head 5 and the encoder ring 3 should be less than the pitch of the magnetic scale.

The sensor head 5 comprises a flux gate which is adapted to sense the magnetic field produced by the magnetic poles on the circumferential edge 7 of the encoder ring 3. Excitation and processing circuitry 9 is provided for generating the excitation signal for the flux gate and for processing the signals output by the flux gate in order to determine position, speed and/or acceleration information of the encoder ring 3. As shown, the excitation and processing circuitry 9 is, in this embodiment, provided separately from the sensor head 5, and does not therefore, have to endure the harsh operating conditions of the sensor head 5.

Figure 2A:
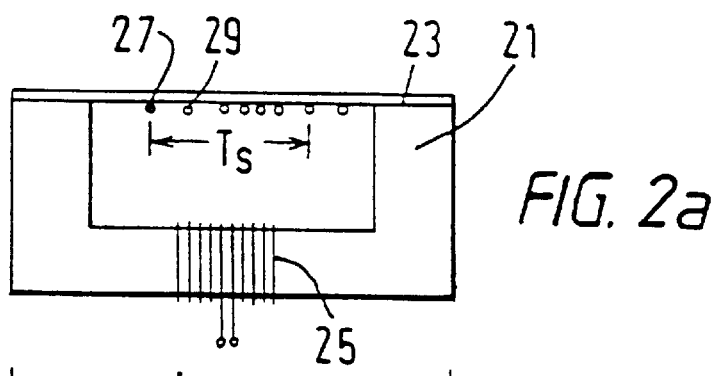
FIG. 2a is a schematic cross-sectional view of a sensor head forming part of the position encoder shown in FIG. 1.

FIG. 2a is a schematic cross-sectional view of the sensor unit 5, which comprises a U-shaped ferrite core 21; a saturable soft magnetic material 23 (for example, spin-melt ribbon, grade 6025, 30 μm thick from Vacuumschmelze, 6450 Hanau, Germany) placed across the open end of the ferrite core 21; an excitation coil 25 having approximately 70 turns of winding around the ferrite core 21; and sense coils 27 and 29 located adjacent and insulated from the saturable material 23, each arranged in a figure of eight configuration and shifted relative to each other so that the output signals therefrom are in phase quadrature. Both the excitation coil 25 and the sense coils 27 and 29 are, in this embodiment, provided by 40 μm diameter enameled copper wire. In this embodiment, the length L of the ferrite core 21 is 5 mm and the pitch $T_s$ of each sense coil 27 and 29 is matched with the pitch of the magnetic poles on the encoder ring 3, i.e. $T_s$ is 1 mm, and sense coil 29 is shifted 0.25 mm to the right of sense coil 27. As will become apparent from the following description, matching the pitch of the sense coils with that of the magnetic scale on the encoder ring 3 results in maximum coupling of the signal carrying the positional information.

Figure 2B:
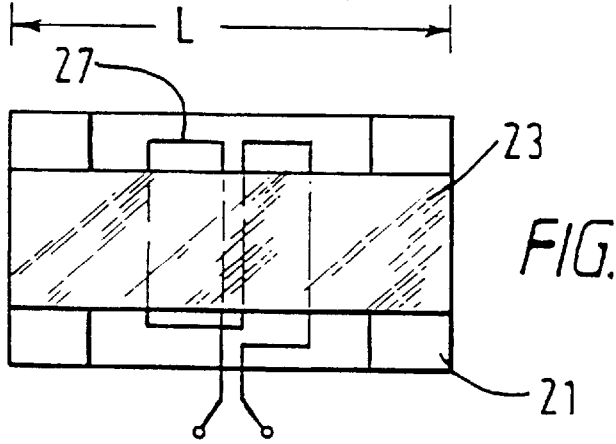
FIG. 2b is a plan view of the sensor head forming part of the position encoder shown in FIG. 1.

FIG. 2b is a plan view of FIG. 2a and shows the U-shaped ferrite core 21, the saturatable soft magnetic material 23 and sense coil 27. The excitation coil 25 and the other sense coil 29 have been omitted from FIG. 2b for clarity. As can be seen from FIG. 2b, sense coil 27 comprises two rectangular loops of conductors connected together in series in a figure of eight arrangement, whereby any EMF induced in one loop by background electromagnetic interference will cancel out the EMF induced in the other loop by the same interference. This arrangement, of sense coils therefore, results in a sensor which is insensitive to background electromagnetic interference.

The principle of operation of the position encoder of this embodiment will now be described with reference to FIGS. 3 to 9.

Figure 3:
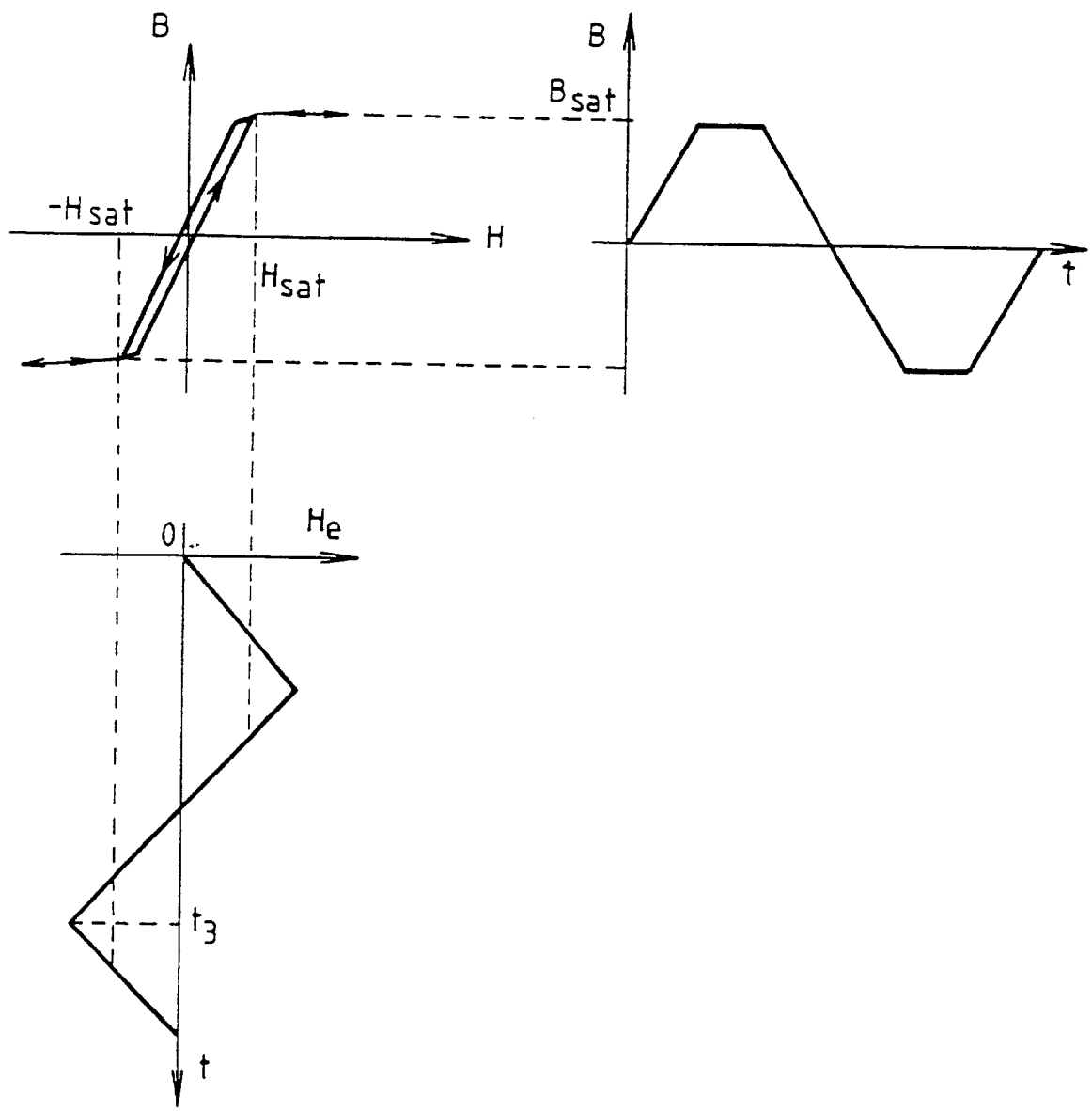
FIG. 3 shows a series of plots which illustrates the way in which magnetic flux density within a saturatable soft magnetic material changes in response to a changing external magnetic field.

FIG. 3 shows a series of plots which illustrates the way in which the saturatable soft magnetic material 23 changes in an external magnetic field (H). In particular, the plot in the top left hand corner of FIG. 3 illustrates the way in which the magnetic flux density (B) inside the saturatable material 23 varies with external magnetic field (H). As shown in this plot, the material shows hysteresis and is saturated by an external magnetic field of $+H_{sat}$. Directly below this plot there is a plot of the magnetic field ($H_e$) generated by an excitation current flowing in the excitation coil 25. In this embodiment, the excitation current (and hence the corresponding excitation magnetic field $H_e$) has a periodic triangular waveform. The top right hand corner of FIG. 3 illustrates the way in which magnetic flux density B in the material varies in response to the excitation magnetic field $H_e$.

As can be seen from FIG. 3, when the excitation magnetic field $H_e$ reaches $H_{sat}$, the magnetic flux density B inside the saturatable material 23 reaches its maximum value $B_{sat}$, and at this time the material 23 is said to be fully saturated. As the magnetic field ($H_e$) increases beyond $H_{sat}$, the flux density (B) within the material 23 remains the same and the additional flux passes along the outside of the material back to the ferrite core 21. When the excitation magnetic field $H_e$ reduces, the material 23 comes out of saturation and becomes fully saturated again when the external magnetic field reaches $-H_{sat}$.

As is well known in the art, an electromotive force (EMF) is induced in a coil placed in a magnetic field, whenever the magnetic field through the coil changes. Considering the sensor head shown in FIG. 2 when an AC excitation current is applied and when no encoder ring 3 is present, it will be apparent to those skilled in the art that the magnetic field in the vicinity of the sense coils 27 and 29 is such that no EMFs are induced therein, even when the magnetic material 23 is saturated. This is mainly because the sense coils 27 and 29 are orthogonal to the excitation magnetic field, and hence do not couple with it. Further, even if some of the excitation magnetic field does couple with the loops of the sense coils 27 and 29, most of it will cancel due to the figure of eight arrangement and any residual excitation interference will be reduced further by the excitation and processing, circuitry 9. In contrast, as will be explained below, when the encoder ring 3 is present, the DC magnetic fields from the N and S poles recorded on the encoder ring 3 interact with the excitation magnetic field $H_e$ to produce local changes in the magnetic field in the vicinity of sense coils 27 and 29, which local changes induce an EMF in each. As will be shown below, the magnitude of this EMF is dependent upon the position of the encoder ring 3. Therefore, position, direction, speed and acceleration information for the encoder ring 3 can be derived from these EMFs.

Figure 4A:
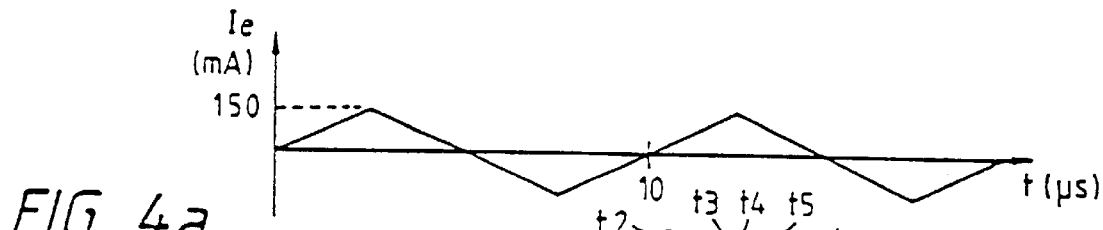
FIG. 4a shows the way in which an excitation current applied to the sensor head, and the corresponding excitation magnetic field which results therefrom, varies with time.

The way in which the magnetic field from the encoder ring interacts with the excitation magnetic field $H_e$ to produce these EMFs will now be explained with reference to FIGS. 4 to 7. FIG. 4a shows the way in which the excitation current $I_e$ and the corresponding excitation magnetic field $H_e$ varies with time. As shown in FIG. 4a, the excitation current has a triangular wave form having a peak value of 150 mA and a period of 10 μs (i.e. a frequency of 100 kHz). Since the excitation magnetic field $H_e$ is proportional to the excitation current $I_e$, the excitation magnetic field also has a triangular waveform having a period of 10 μs. In this embodiment, the frequency of the excitation current is chosen to be much greater than the speed of rotation of the encoder ring 3 so that, to the processing el ectronics, the encoder ring 3 looks stationary.

Figure 4B:
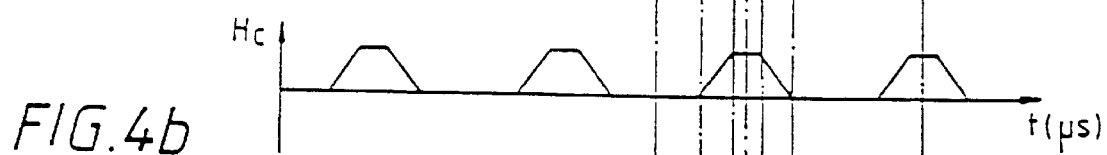
FIG. 4b illustrates the way in which the magnetic field which couples with a sense coil forming part of the sensor head and the way in which the EMF induced in that sense coil as a result, varies with time when the excitation current shown in FIG. 4a is applied to the excitation coil and when the encoder ring is in a first position.

FIG. 4b illustrates the way in which the magnetic field ($H_c$) which couples into sense coil 27 varies with time and the way in which the EMF induced in sense coil 27 varies with time, when the encoder ring 3 is in a first position. FIGS. 5a to 5d illustrate how the magnetic field from the encoder ring 3 interacts with the excitation magnetic field $H_e$ at different time points, when the encoder ring 3 is in the abovementioned first position. In FIGS. 5a to 5d, the amount of flux passing through the material 23 is represented by the number of magnetic field lines passing through it. In order to represent that the material 23 can saturate, a maximum of two field lines is allowed to pass through the material at any given point.

Figure 5A:
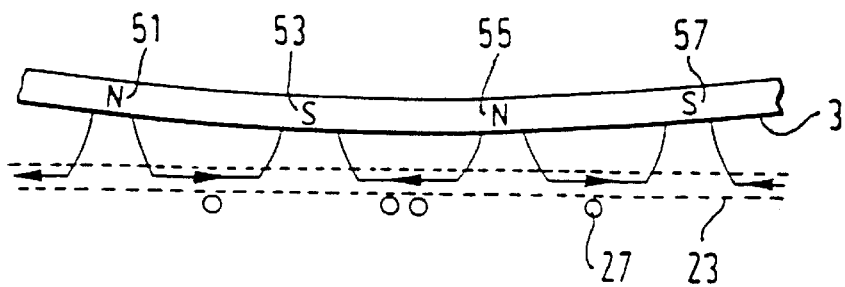
FIG. 5a illustrates the interaction between a DC magnetic field from the encoder ring and the AC excitation magnetic field at time $t_1$, when the encoder ring is in a first position.

FIG. 5a illustrates the interaction between the DC magnetic field from the encoder ring 3 and the AC excitation magnetic field $H_e$ at time $t_1$ shown in FIG. 4a, i.e. when the excitation magnetic field $H_e$ is zero. As shown in FIG. 5a, magnetic flux passes from N pole 51 in equal amounts to S pole 53 and to the S pole (not shown) on its left hand side. Similarly, equal amounts of magnetic flux pass from N pole 55 through the magnetic material 23 to S poles 53 and 57. S pole 57 also receives flux from the N pole (not shown) on its right hand side. All the magnetic flux from the encoder ring 3 passes through the material 23, and therefore, as shown in FIG. 4b, no magnetic field couples with sense coil 27.

Figure 4C:
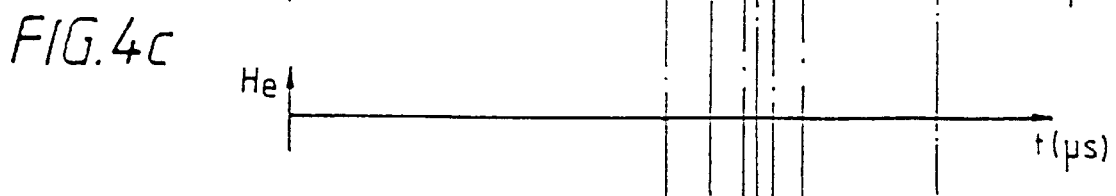
FIG. 4c illustrates the way in which the magnetic field which couples with a sense coil forming part of the sensor head and the way in which the EMF induced in that sense coil as a result, varies with time when the excitation current shown in FIG. 4a is applied to the excitation coil and when the encoder ring has rotated through 1/256 of a revolution clockwise from the first position.
Figure 4D:
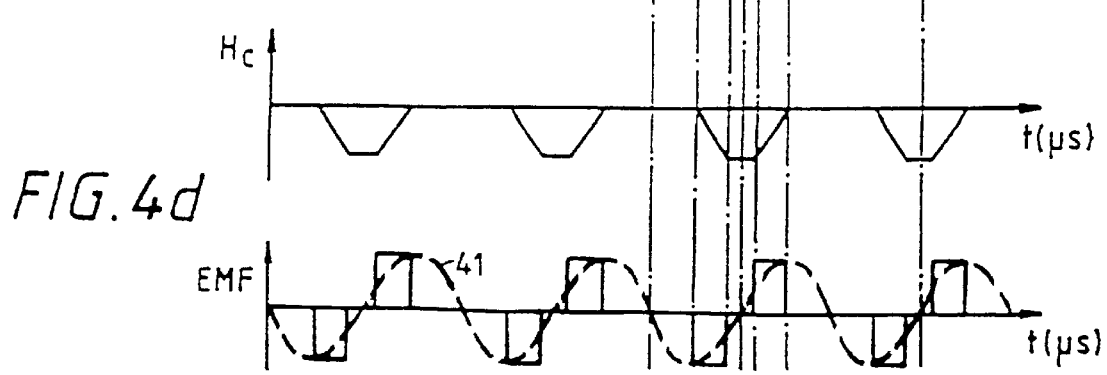
FIG. 4d illustrates the way in which the magnetic field which couples with a sense coil forming part of the sensor head and the way in which the EMF induced in that sense coil as a result, varies with time when the excitation current shown in FIG. 4a is applied to the excitation coil and when the encoder ring has rotated through 1/128 of a revolution clockwise from the first position.
Figure 5B:
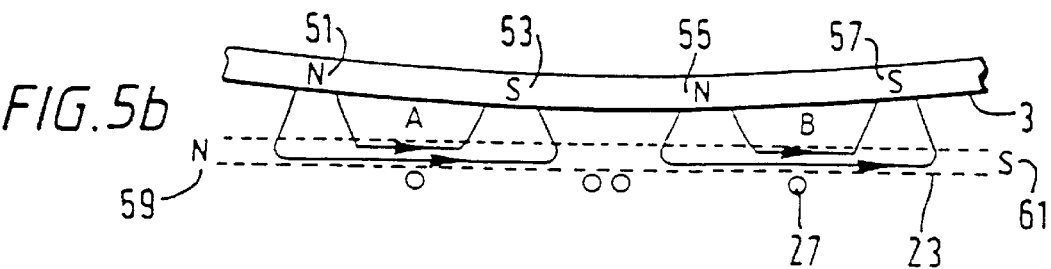
FIG. 5b illustrates the interaction between the DC magnetic field from the encoder ring and the AC excitation magnetic field at time $t_2$, when the encoder ring is in the first position.

FIG. 5b illustrates the interaction between the DC magnetic field from the encoder ring 3 and the AC excitation magnetic field $H_e$ at time $t_2$ shown in FIG. 4. In this embodiment, when the excitation field $H_e$ is positive, excitation magnetic flux passes from the left hand side of the saturatable material 23 to the right hand side. In other words, at time $t_2$, it appears as if there is a N pole at the left hand side of the saturatable material 23 and a S pole at the right hand side. These poles are illustrated in FIG. 5b by N pole 59 and S pole 61 respectively.

As can be seen by comparing the field lines in FIGS. 5a and 5b, N pole 59 and S pole 61 affect the magnetic field from the encoder ring 3. In particular, in FIG. 5a, when there is no excitation magnetic field, the magnetic flux passing from N pole 51 to S pole 53 is the same as the magnetic flux passing from N pole 51 to the S pole (not shown) on its left hand side. In contrast, at time $t_2$, the magnetic flux passing from N pole 51 to S pole 53 has increased and the magnetic flux passing from N pole 51 to the S pole (not shown) on its left hand side has decreased, due to the influence of N pole 59. Similarly, the magnetic flux passing from N pole 55 to S pole 57 has increased and the magnetic flux passing from N pole 55 to S pole 53 has decreased, due to the influence of S pole 61. As shown in FIG. 5b, there are two field lines (representing maximum flux density) at regions A and B of the material 23. Consequently, any more flux which tries to pass through these regions will be expelled from the material 23 and will couple with the sense coil 27. Therefore, as shown in FIG. 4b, time $t_2$ corresponds to the time when some magnetic field ($H_c$) is about to couple into sense coil 27.

Figure 5C:
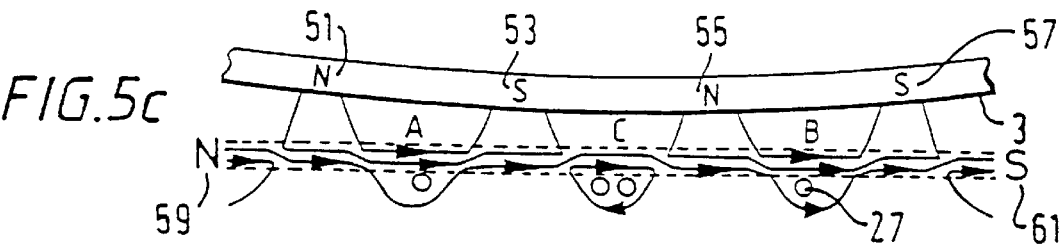
FIG. 5c illustrates the interaction between the DC magnetic field from the encoder ring and the AC excitation magnetic field at time $t_4$, when the encoder ring is in the first position.

FIG. 5c illustrates the interaction between the DC magnetic field from the encoder ring 3 and the AC excitation magnetic field $H_e$ at time $t_4$ shown in FIG. 4a, i.e. when the excitation magnetic field $H_e$ is at its maximum positive value. Therefore, N pole 59 in FIG. 5c will be stronger than N pole 59 shown in FIG. 5b. Similarly, S pole 61 in FIG. 5c is stronger than S pole 61 shown in FIG. 5b. This is illustrated in FIG. 5c by using larger letters (N and S) than those used in FIG. 5b. As shown in FIG. 5c, at time $t_4$ more magnetic flux passes through the material 23, and consequently, at regions A and B magnetic flux is expelled from the material, which flux couples with sense coil 27. Magnetic flux is also expelled from the material 23 at region C because of the interaction of the excitation field $H_e$ with the magnetic field between S pole 53 and N pole 55 on the encoder ring 3.

As shown by the direction of the arrows of the magnetic field lines which couple with sense coil 27, the magnetic field which couples with the left hand loop of sense coil 27 points in the opposite direction to the magnetic field which couples with the right hand loop of sense coil 27. However, since the two loops of the sense coils are wound in the opposite direction (because of the figure of eight configuration), when the amplitudes of these magnetic fields are changing, the EMF's induced in each loop of the sense coil 27 add to produce an output EMF.

Referring back to FIG. 4b, between time $t_2$ and $t_3$, the amplitude of the coupling magnetic field $H_c$ is increasing, and therefore, a positive EMF is induced in sense coil 27 during this time interval. At time $t_3$, the material 23 becomes fully saturated along its length, and as the excitation field increases beyond time $t_3$, the additional excitation magnetic flux passes outside the material 23 along its length and returns to the ferrite core 21, without coupling with sense coil 27. Therefore, while the whole of the material 23 is fully saturated, the coupling magnetic field $H_c$ remains constant and so no EMF is induced in sense coil 27. At time $t_5$, the material 23 comes out of saturation and between time $t_5$ and $t_6$ the coupling magnetic field $H_c$ reduces to zero. Consequently, between time $t_5$ and $t_6$ a negative EMF is induced in sense coil 27 during this time interval.

As shown in FIG. 4b, a similar coupling magnetic field $H_c$ is coupled into sense coil 27 during the negative half cycle of the excitation magnetic field $H_e$. Therefore, the same EMF signal is induced in sense coil 27 during this negative half cycle. To illustrate the interaction between the DC magnetic field from the encoder ring 3 and the excitation magnetic field $H_e$ during this negative half cycle, this interaction will now be described at time $t_7$ shown in FIG. 4a, with reference to FIG. 5d.

Figure 5D:
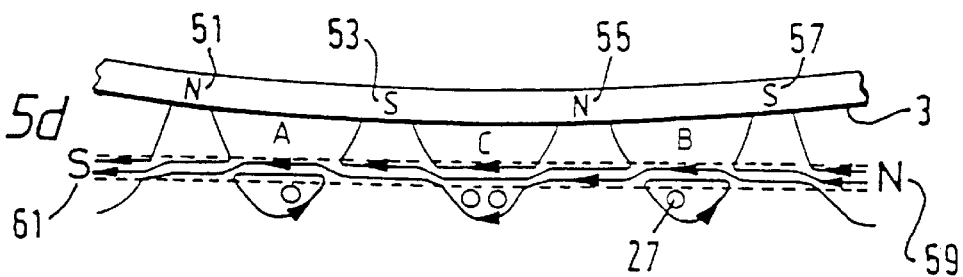
FIG. 5d illustrates the interaction between the DC magnetic field from the encoder ring and the AC excitation magnetic field at time $t_7$, when the encoder ring is in the first position.

As shown in FIG. 5d, N pole 59 is now on the right hand side of the material 23 and S pole 61 is on the left hand side. Consequently, the excitation magnetic flux passes from the right hand side of the material 23 to the left hand side and interacts with the magnetic flux from the encoder ring 3. As can be seen by comparing the field lines in FIGS. 5a and 5d, the magnetic flux passing between N pole 55 and S pole 53 has increased at time $t_7$, and the magnetic flux passing from N pole 55 to S pole 57 and the flux passing from N pole 51 to S pole 53 has reduced. Furthermore, as can be seen by comparing the direction of the magnetic field lines in FIG. 4c with those in FIG. 5d, the coupling magnetic field $H_c$ is in the same direction. Therefore, as will be appreciated, the EMF induced in sense coil 27 during the negative half cycle of an excitation field $H_e$ is the same as the EMF induced in the positive half cycle.

As shown in FIG. 4b, the EMF induced in sense coil 27 is a periodic square wave having a fundamental component (shown in phantom) 41, whose frequency is twice that of the excitation current. As will become apparent from the following description, the peak amplitude of this fundamental component 41 is dependent upon the position of the encoder ring 3. Therefore, by processing this fundamental component 41 positional information of the encoder ring 3 can be determined.

Figure 6:
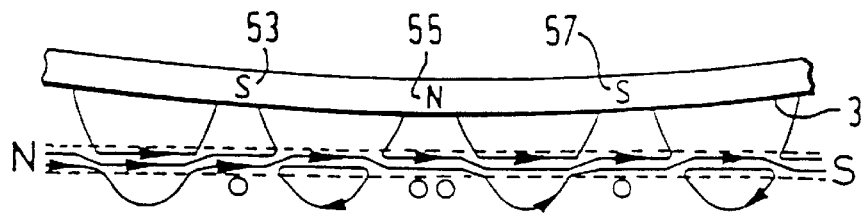
FIG. 6 illustrates the interaction between the DC magnetic field from the encoder ring and the AC excitation magnetic field at time $t_4$, when the encoder ring 3 has rotated through 1/256 of a revolution clockwise from the first position.

FIG. 6 illustrates the interaction between the DC magnetic field from the encoder ring 3 and the AC excitation magnetic field $H_e$ at time $t_4$, when the encoder ring has rotated clockwise through 1/256 of a revolution.

As shown in FIG. 6, no magnetic field couples with sense coil 27 and therefore no EMF is induced therein. As shown in FIG. 4c, this is true for a complete cycle of the excitation magnetic field $H_e$.

Figure 7:
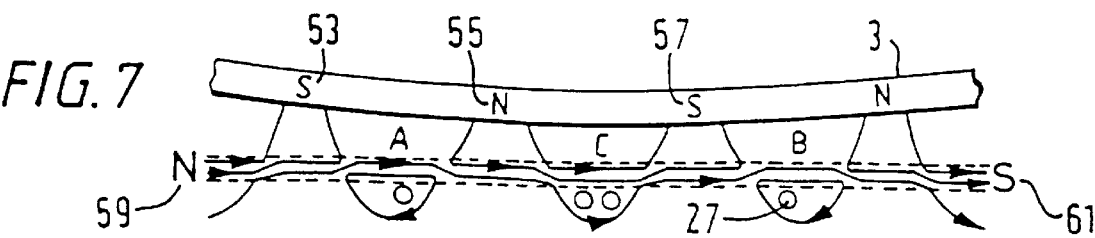
FIG. 7 illustrates the interaction between the DC magnetic field from the encoder ring and the AC excitation magnetic field at time $t_4$, when the encoder ring 3 has rotated through 1/128 of a revolution clockwise from the first position.

FIG. 7 illustrates the interaction between the DC magnetic field from the encoder ring 3 and the AC excitation magnetic field $H_e$ at time $t_4$, when the encoder ring 3 has rotated clockwise through a further 1/256 of a revolution. As shown in FIG. 7, magnetic flux couples with sense coil 27. However, as can be seen by comparing the direction of the field lines in FIG. 7 with those in FIG. 5d, the coupling magnetic field $H_c$ is in the opposite direction. Therefore, as shown in FIG. 4d, the coupling magnetic field $H_c$ has the same form as that shown in FIG. 4b, but has the opposite polarity. The same is true of the EMF induced in sense coil 27 when the encoder ring 3 is in this position.

Therefore, in moving through 1/128 of a revolution of the encoder ring 3, the peak amplitude of the fundamental component 41 of the EMF induced in sense coil 27 has varied from a positive value to a negative value. Similarly, if the encoder 3 rotates a further 1/128 of a revolution, the peak amplitude of the fundamental component 41 will return to the above positive value. By considering various positions of the encoder ring 3, it can be shown that the peak amplitude of the fundamental component 41 varies sinusoidally with the angular position of the encoder ring 3 and repeats itself every 1/64 of a revolution. In other words, the pitch of the sinusoidal variation matches that of the magnetic scale on the encoder ring 3.

As those skilled in the art will appreciate, a similar EMF will be induced in sense coil 29, however, since sense coil 29 is shifted by a quarter of the pitch of the magnetic scale on the encoder ring 3, the EMF induced in sense coil 29 is in phase quadrature with the EMF induced in sense coil 27. Therefore, these two EMFs can be used to unambiguously determine the position of the encoder ring 3 within a single pitch of the magnetic scale. In this embodiment, in order to unambiguously determine the position of the encoder ring 3 throughout a complete revolution, a counter is used to count the number of periods through which the fundamental component 41 cycles from a given reference point.

Figure 8:
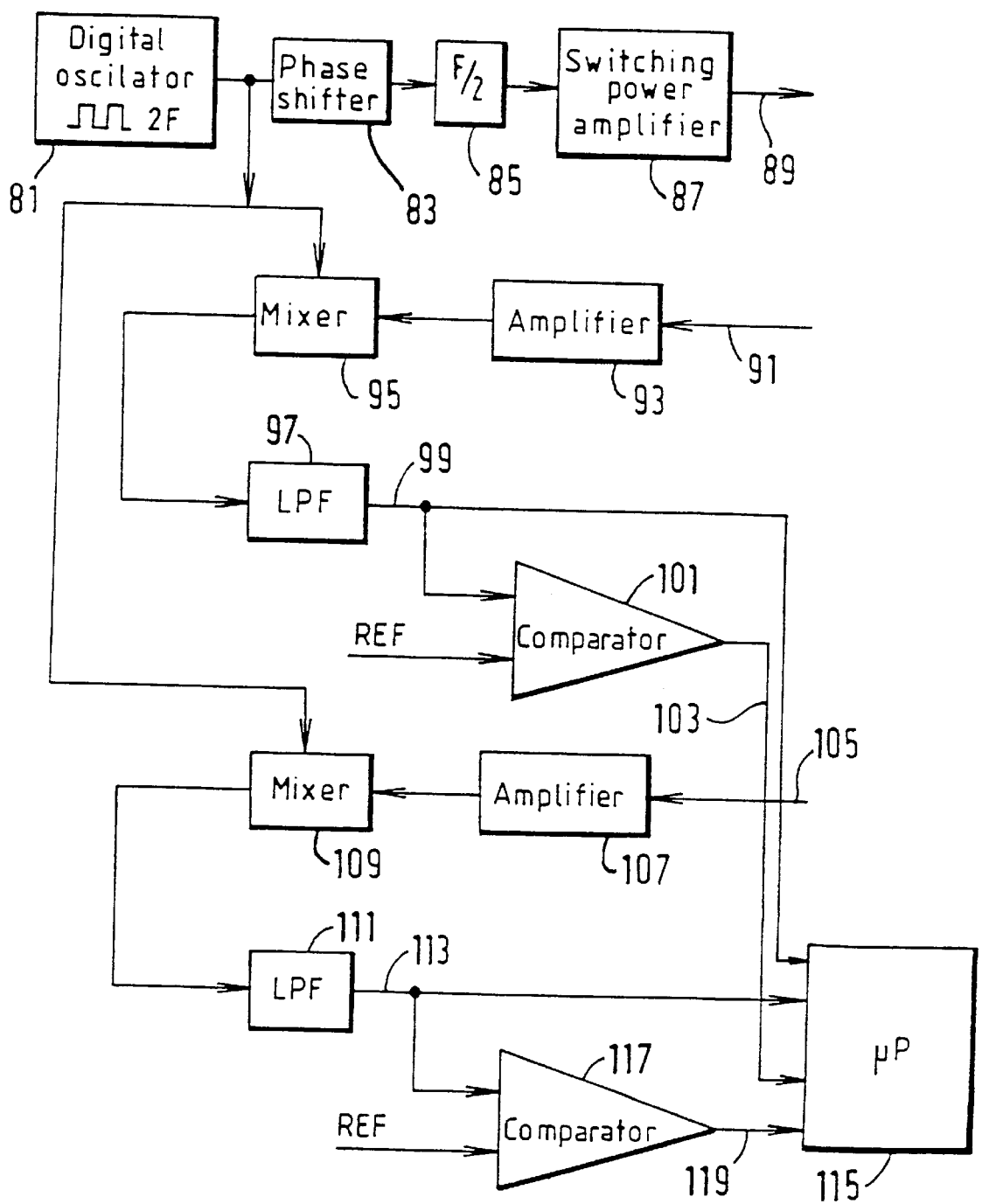
FIG. 8 is a schematic representation of exemplary excitation and processing circuitry used in the position encoder embodying the present invention, to determine position information of the encoder ring.

FIG. 8 schematically represents exemplary excitation and processing circuitry 9 used to excite the excitation coil 25 and to process the signals induced in the sense coils 27 and 29. The excitation signal is generated by a digital oscillator 81 which outputs a square shaped voltage having a frequency F twice that of the desired excitation frequency, ie. in this embodiment at a frequency of 200 kHz. The square wave voltage output from the oscillator 81 is shifted in phase by the phase shifter 83 which compensates for the phase difference between the excitation current and the fundamental component 41. This phase difference is caused by the resistance of the coils and by the physical properties of the saturatable material 23. Therefore, for a given specification of encoder, the required phase shift can be determined and set in the factory.

The frequency of the shifted digital voltage is then halved by the frequency divider 85 before being amplified by the switching power amplifier 87. In this embodiment, the switching power amplifier 87 is designed to ensure that the current applied to the excitation coil 25 does not contain a second harmonic component, i.e. one having a frequency of 2 F. The amplified square wave voltage is then applied to the excitation coil 25. As those skilled in the art will appreciate, application of a square wave voltage to a coil results in a triangular wave current of the same frequency flowing within the coil.

The EMF 91 induced in sense coil 27 comprises the above mentioned fundamental component 41 which has the following form:

$$E_f = A_o \sin\left[\frac{2\pi x}{\lambda}\right] \cdot \sin 4\pi F t \quad (1)$$

where $A_o$ depends upon, among other things, the distance between the sensor head 5 and the encoder ring; $\lambda$ is the repeat angle, which in this embodiment equals 360°/64; x is the rotation angle of the encoder ring 3 (which, in this embodiment, is the angle lying between the line connecting the centre of the encoder ring 3 and the left most conductor of sense coil 27 and the line connecting the centre of the encoder ring 3 and a pre-selected reference N pole); and F is the frequency of the excitation current $I_e$.

The EMF 91 is amplified by the amplifier 93 and passed on to the mixer 95 where it is multiplied with the voltage output by the digital oscillator 81. Since the frequency (and phase) of the fundamental component 41 is the same as that of the voltage output by the oscillator 81, the output of the mixer will have the following form:

$$\hat{E} = A_o \sin\left[\frac{2\pi x}{\lambda}\right] + AC \text{ components} \quad (2)$$

The high frequency AC components are subsequently filtered out by the low pass filter 97 to leave just the signal 99 which is dependent upon the rotation angle of the encoder ring 3 and which is passed to the microprocessor 101 for further processing. The amplifier 93, mixer 95 and the low pass filter 97 are designed so that the processing electronics has a minimum sensitivity to the odd harmonics of the excitation current and has a maximum sensitivity to the second harmonic of the excitation current. The EMF 105 induced in sense coil 29 is processed in a similar manner by the amplifier 107, mixer 109 and low pass filter 111 to generate signal 113 which is also passed to the microprocessor 101 for further processing.

Figure 9A:
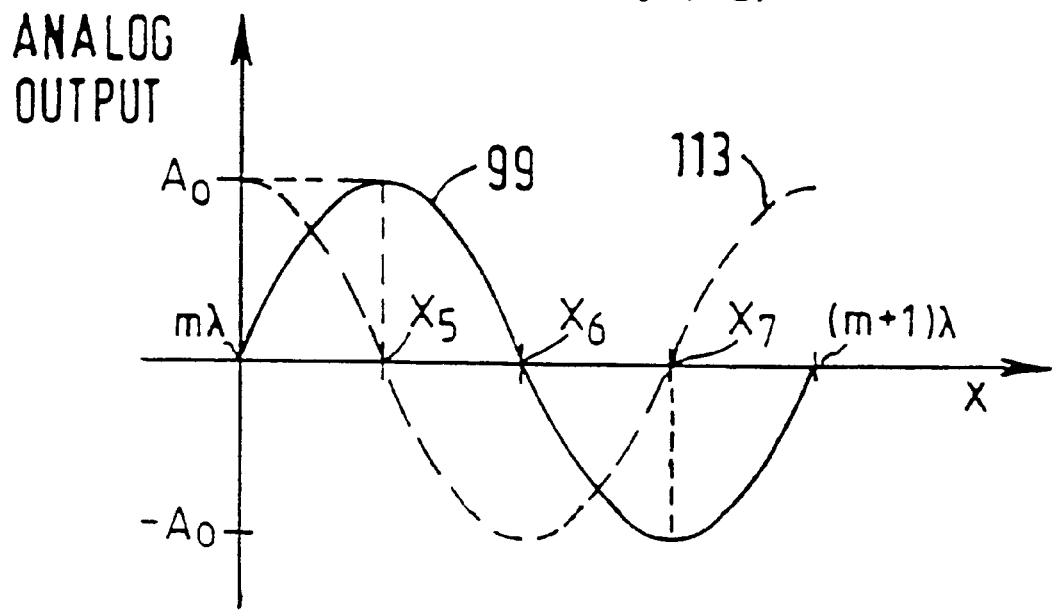
FIG. 9a illustrates the way in which continuously varying signals applied to a microprocessor forming part of the processing circuitry shown in FIG. 8 vary with the angular position of the encoder ring.
Figure 9B:
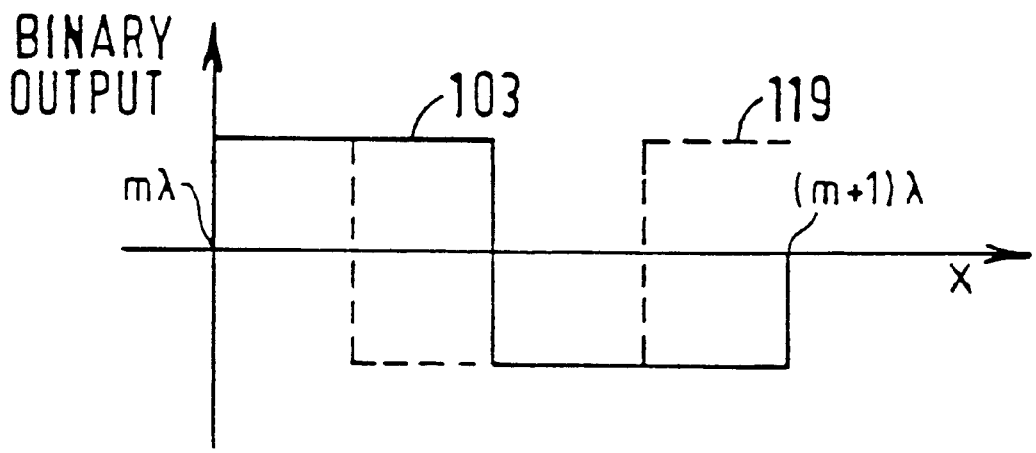
FIG. 9b shows the way in which the signals shown in FIG. 9a vary after comparison with a reference voltage.

FIG. 9a shows that, signals 99 and 113 vary sinusoidally in phase quadrature in dependence upon the rotation angle (x) of the encoder ring 3. As shown in FIG. 9a, signal 99 is zero and signal 113 is at a maximum positive value when x is an integer (M) number of repeat angles $\lambda$, i.e. when the left hand conductor of sense coil 27 is directly adjacent a N pole. FIG. 9a also shows, at positions marked $X_5$, $X_6$ and $X_7$, the amplitude of signal 99 when the encoder ring 3 is in the positions shown in features 5, 6 and 7 respectively.

In this embodiment, in order to determine the rotation angle x within the pitch of the magnetic scale which is adjacent the sense coils 27 and 29, the microprocessor 115 takes a ratio-metric arctangent of signal 99 and signal 113. As will be appreciated by those skilled in the art, by taking a ratio-metric calculation, errors which arise due to changes in gap between the encoder ring 3 and the sensor head 5 are minimised.

As mentioned above, in this embodiment, absolute rotary position throughout 360° is achieved by using a counter incorporated in microprocessor 115 to count the number of periods through which signals 99 and 113 cycle from a given reference point. However, as those skilled in the art will appreciate, other techniques commonly used in the art may be used to determine absolute position throughout a complete revolution of the encoder ring 3. In this embodiment, in order to determine the position of the encoder ring 3 at power on, a magnetic reference feature is provided adjacent one of the pitches on the magnetic scale and a further sense coil (not shown) is provided for detecting this reference feature. As those skilled in the art will appreciate, other calibration techniques commonly used in the art may be used.

As shown in FIG. 8, the signals 99 and 113 are also applied to comparators 101 and 117 respectively, which compares the relative signal with a reference voltage REF. The output signals 103 and 119 from these comparators have the form shown in FIG. 9b and are also input to the microprocessor 115. From signals 103 and 119, the microprocessor 115 can determine the direction of rotation, speed of rotation and the acceleration of the encoder ring 3. The microprocessor could, of course, calculate these parameters by monitoring the way in which signals 99 and 113 change with time. In this embodiment, the comparators 103 and 117 have hysteresis so that fluctuations in the amplitudes of the demodulated signals caused by, for example, electrical noise or vibration of the sensor head 5, do not trigger false changes in level of the comparator outputs 103 and 119.

Figure 10:
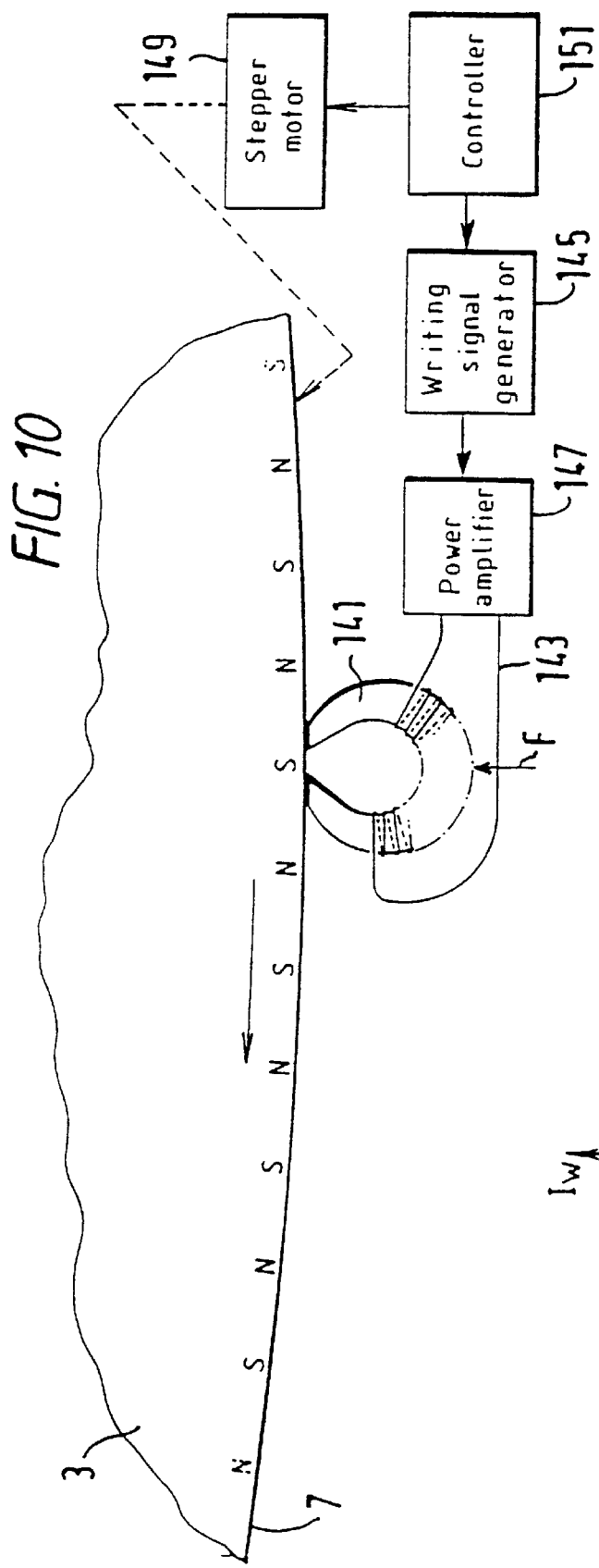
FIG. 10 schematically illustrates a magnetic recording head used to record magnetic north and south poles onto a circumferential edge of the encoder ring.

FIG. 10 schematically illustrates a magnetic recording head used to record the magnetic N and S poles onto the circumferential edge 7 of the encoder ring 3. As shown, the magnetic recording head comprises a C-shaped ferrite core 141, around which is wound an excitation winding 143. During the writing operation, the C-shaped ferrite core 141 is pressed against the circumferential edge 7 of the encoder ring 3 by a force, represented by arrow F, exerted by a spring biassed mechanism (not shown). The recording head includes a writing signal generator 145, which applies the appropriate signals for writing the N and S poles onto the encoder ring 3 via the amplifier 147. In order to accurately place the N and S poles on the circumferential edge 7, the rotation of the encoder ring 3 is controlled by a stepper motor 149, which in turn is controlled by the controller 151. The controller also controls the signal generator 145 so that the N and S poles are written onto the encoder ring 3 in the appropriate places.

Figure 11:
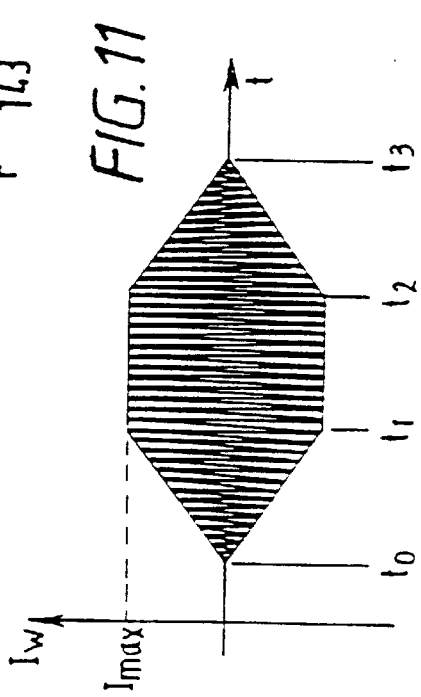
FIG. 11 shows the form of excitation current applied to the magnetic recording head in order to generate a continuous series of alternating north and south poles on the circumferential edge of the encoder ring.

FIG. 11 shows a preferred form of writing current $I_w$ input to the excitation winding 143 during the writing process. As shown, the writing current $I_w$ varies sinusoidally and its amplitude is ramped up from zero at time to $t_o$ a maximum value $I_{max}$ at time $t_1$. In this embodiment, $I_{max}$ is in the order of several amps. Between time $t_1$ and time $t_2$, the amplitude of the writing current $I_w$ is kept constant and then it is ramped down to zero at time $t_3$. The controller 151 controls the stepper motor 149 so that between times $t_o$ and $t_1$, between times $t_1$ and $t_2$ and between times $t_2$ and $t_3$, the encoder ring 3 completes a single revolution. Therefore, in order to write 64 N poles and 64 S poles on the circumferential edge 7 of the encoder ring 3, the excitation current must complete 64 periods during each of these intervals. The inventors have established that by using a writing current $I_w$ having the form shown in FIG. 11, a more regular continuous serious of N and S poles is written onto the circumferential edge 7 of the encoder ring 3, than is obtained when a constant amplitude writing current is used.

In the sensor head shown in FIG. 2, the position of the sense coils 27 and 29 relative to the saturatable material 23 was shown schematically. The way in which the sense coils are formed depend upon the required size of the sensor head. For example, in applications where the sensor head has to be relatively small (ie. several mm or less), the sense coils can be formed by conductors on a printed circuit board; by a thick film of conductor on a ceramic substrate; or by a thin film of conductor on silicon.

Figure 12A:
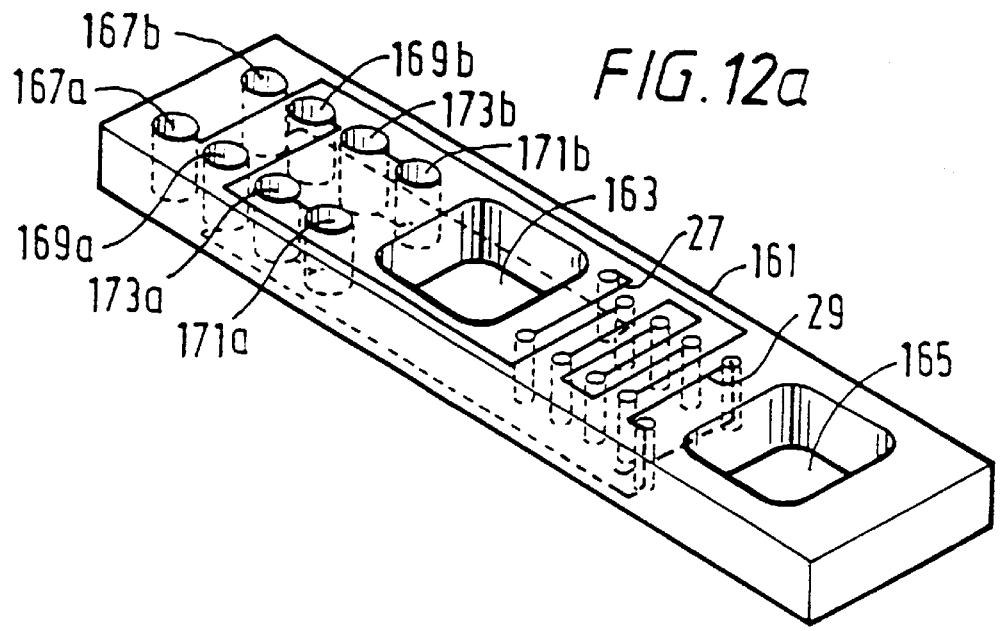
FIG. 12a schematically illustrates the way in which the sense coils of the sensor head may be implemented using a printed circuit board design.
Figure 12B:
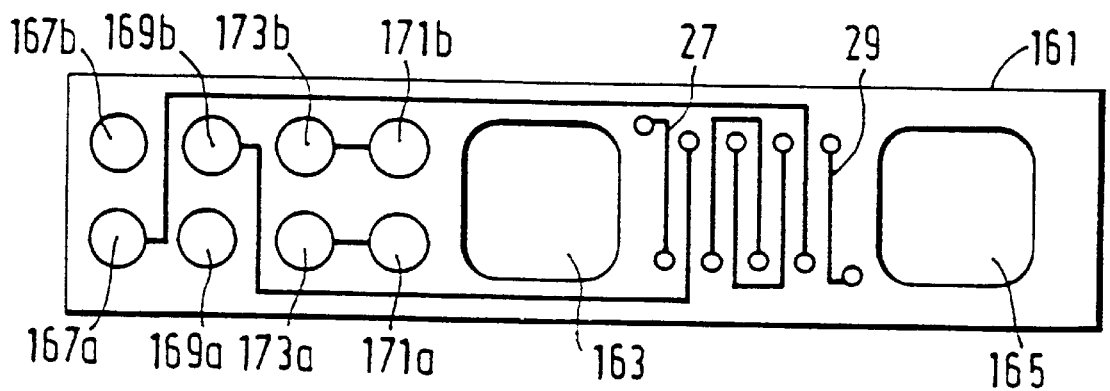
Figure 12C:
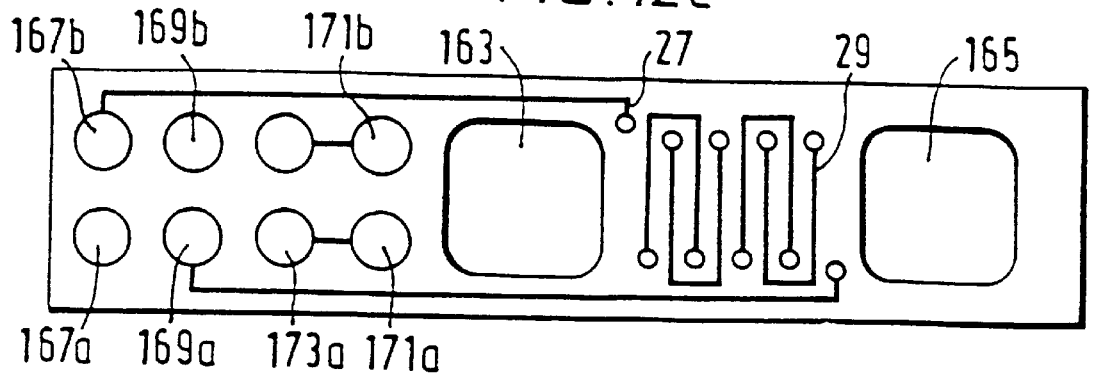

FIG. 12 illustrates the way in which sense coils 27 and 29 can be formed on a printed circuit board 161 which in this embodiment, has a length of approximately 13 mm, a width of 3 mm and a thickness of 0.4 mm. FIG. 12a is a perspective view of the printed circuit board and FIGS. 12b and 12c show its top and bottom layers of conductors. As shown, the printed circuit board 161 has through holes 163 and 165 for receiving the upstanding limbs of the U-shaped ferrite core 21 of the sensor head. At the left hand end of the printed circuit board 161 holes 167a and 167b are provided for attaching leads from the excitation and processing circuitry 9 to the ends of sense coil 27. Similarly, through holes 169a and 169b are also provided for connecting leads from the processing circuitry 9 to the ends of sense coil 29. Holes 171a and 171b are provided for connecting the ends of the excitation coil 25 to the printed circuit board, and holes 173a and 173b, which are electrically connected to through holes 171a and 171b respectively, are provided for receiving connection leads so that the excitation coil 25 can be connected with the excitation and processing circuitry 9.

In this implementation of the sense coils 27 and 29, the coil's cross-section is orthogonal to the plane of the printed circuit board. In other words, the loops of the sense coils 27 and 29 lie within the thickness of the printed circuit board 161. The conductors on each side of the printed circuit board 161 are connected through via holes. The main advantage of this layout is that fewer tracks and vias are required per pitch length, thus enabling very small pitch (approximately 1.2 mm) sense coils to be manufactured using standard printed circuit board manufacturing techniques. In this implementation, the sense coils 27 and 29 form two series connected figure of eight loops which extend over two pitches of the magnetic scale on the encoder ring 3. This design has the advantage that the output signals on each sense coil 27 and 29 represent the average position over two pitches of the magnetic scale on the encoder ring 3. As those skilled in the art will appreciate, since the cross-section of the sense coils 27 and 29 is orthogonal to the plane of the printed circuit board 161, when the saturatable material 23 is fully saturated, excitation magnetic flux will couple with the sense coils. However, in view of the figure of 8 configuration of the sense coils 27 and 29 no net EMF will be induced directly by the excitation magnetic flux.

FIG. 13 illustrates the way in which sense coils 27 and 29 can be formed as a thick film of printed conductors on a ceramic substrate 201. As shown, the ceramic substrate 201 has through holes 203 and 205 for receiving the upstanding limbs of the U-shaped ferrite core 21 of the sensor head. In this embodiment, the ferrite core 21 is formed as a layer of ferrite ink printed on an aluminium oxide substrate, which is located below the ceramic substrate 201. Each sense coil 27 and 29 is formed using a high resolution silk screen printing technique. As shown, each sense coil 27 and 29 comprises two loops wound in the opposite sense. As those skilled in the art will realise, the conductors of each sense coil 27 and 29, are formed on two separate conducting layers with an insulating layer between them, with via holes connecting the two conductive layers where appropriate. In this embodiment the drive coil (not shown) is formed as a printed layer of conductor which is wound around the ferrite core 21.

On the left hand end of the ceramic substrate 201, the ends of sense coil 27 are connected to conductor pads 207a and 207b and the ends of sense coil 29 are connected to conductor pads 209a and 209b. On the right hand end of the ceramic substrate 201, conductive pads 210a and 210b are provided having holes 211a and 211b for receiving the ends of the excitation coil 25. The conductive pads 207, 209 and 210 facilitate the connection of the sense coils 27 and 29 and the excitation coil 25 to the excitation and processing circuitry 9.

In FIG. 13, each loop of the sense coils 27 and 29 is formed with a single turn of conductor. FIG. 14 illustrates the way in which two turns of conductor can be used to form each loop of the sense coils 27 and 29. With this particular implementation, the output signal levels are increased due to the doubling of the number of conductors forming each loop of the sense coils 27 and 29.

The advantages of using a thick film technique for forming the sense coils 27 and 29 include: (i) the possibility of high temperature operation (greater than 180° C.); (ii) the ability to accurately design and locate the sense coils, even at pitches less than 1 mm; and (iii) the ability to be able to use multiple turns of conductors per sense coil, which increases the output signal levels thereby by making the electronic processing cheaper and easier to design, and (iv)

the ability to use a silk screen printed ferrite core, rather than providing a separate relatively bulky ferrite yoke.

Figure 15:
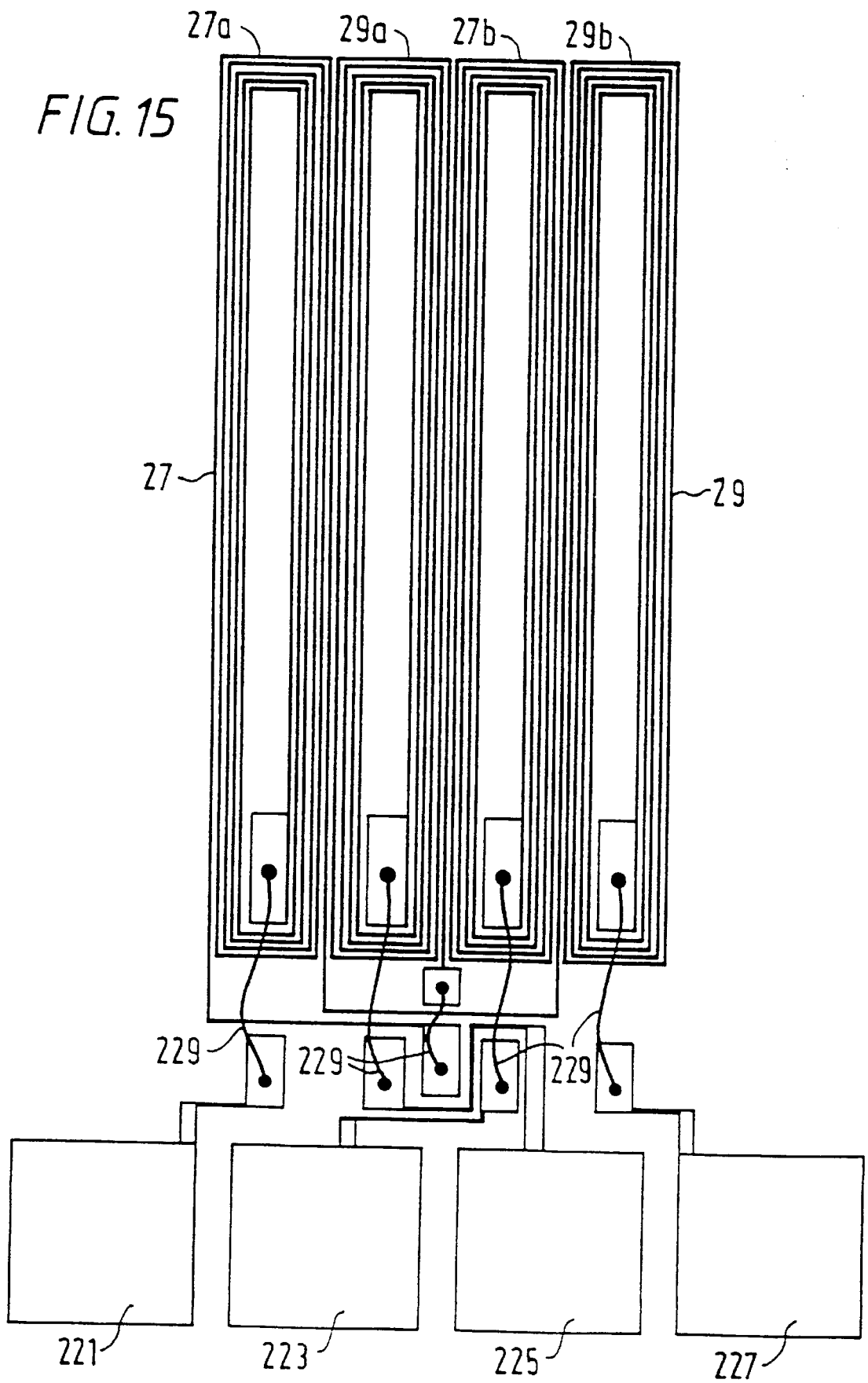
FIG. 15 illustrates a sense coil layout for the sensor head when implemented on silicon.

FIG. 15 illustrates the way in which the sense coils 27 and 29 may be formed on a silicon substrate (not shown) using a standard silicon fabrication process. As shown in FIG. 15, each sense coil 27 and 29 comprises two loops 27a and 27b and 29a and 29b, each comprising 5 turns of conductor. The ends of sense coil 27 are connected to output pads 221 and 223 and the ends of sense coil 29 are connected to output pads 225 and 227. In order to avoid crossing conductors, wire bonds 229 are provided. This implementation has the advantages of having fine tracks which allow multiple turns of coil conductor per sense coil and small coil pitch; and the possibility of fabricating the sense coils on the same silicon as the processing electronics.

Although several implementations of the sense coils 27 and 29 have been described, further modifications will be apparent to those skilled in the art. For example, it would be possible to curve the sensor head around an arc of the encoder ring 3 and use multi period sense coils. Such an arrangement provides the advantage of averaging the signal over a number of pitches of the magnetic scale, thereby minimising errors which may arise in the output signals caused by any non-uniformities in the magnetic scale.

FIG. 16 schematically illustrates the form of a sensor head 5 forming part of a position encoder according to a second embodiment of the present invention. As shown, in this embodiment, the sensor head 5 is mounted adjacent (at a distance S) to the end face 251 of the encoder ring 3. In this embodiment, a magnetic pattern, which is designed to interact with sense coils (not shown) on the sensor head 5, is written onto the end face 251 so that the position of the encoder ring 3 can be unambiguously determined over a rotation angle of 120°. As shown in FIG. 16, the magnetic pattern on the end face 251 comprises three N poles and three S poles arranged in a continuous alternating series such that the angle between like poles is 120°, ie. the pitch of the magnetic scale in this embodiment is 120°. The excitation and processing circuitry 9 is the same as that in the first embodiment, except there is an extra channel (ie. amplifier, mixer, LPF and comparator), since in this embodiment, three sense coils are used as shown in FIG. 17.

Figure 17A:
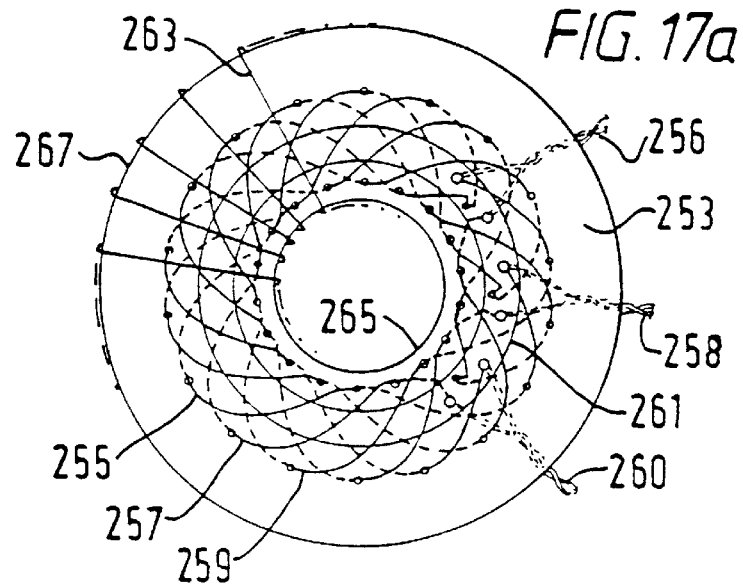
FIG. 17a is a schematic view of sense coils formed on a printed circuit board which forms part of the position encoder shown in FIG. 16.

FIG. 17a shows the conductors on a printed circuit board 253 which form the three sense coils of this embodiment. As shown, the three sense coils 255, 257 and 259 extend circumferentially around the circuit board 253. Each sense coil 255, 257 and 259 comprises 6 loops of series connected conductors, connected such that adjacent loops are wound in the opposite sense. The repetition period of the sense coils 255, 257 and 259 is the same as the pitch of the magnetic scale on the end face 251 of the encoder ring 3. The ends of the sense coils 255,257 and 259 are connected to the excitation and processing circuitry 9 by the twisted wire pairs 256,258 and 260 respectively. FIG. 17a also shows a ring of saturatable soft magnetic material 261 which extends over the sense coils 255, 257 and 259 and part of the excitation coil 263 which is wound radially from the inner edge 265 to the outer edge 267 of the printed circuit board 253.

Figure 17B:
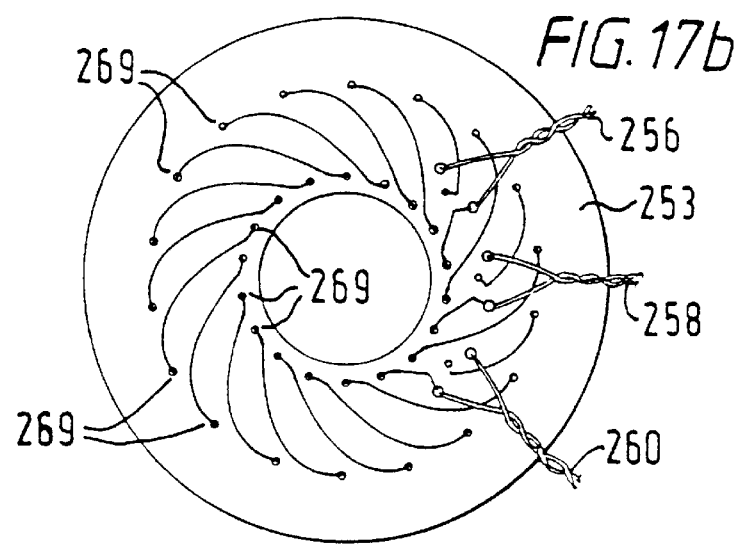
Figure 17C:
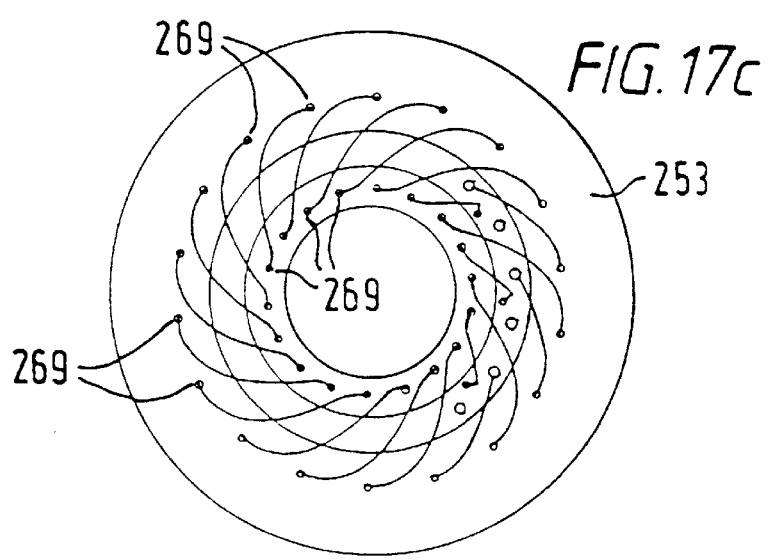

FIGS. 17b and 17c illustrate the way in which the sense coils 255,257 and 259 shown in FIG. 17a are formed by a top and bottom layer of printed conductors respectively. The conductors on the top and bottom layers are connected, where appropriate, through via holes, some of which are referenced 269.

Figure 18:
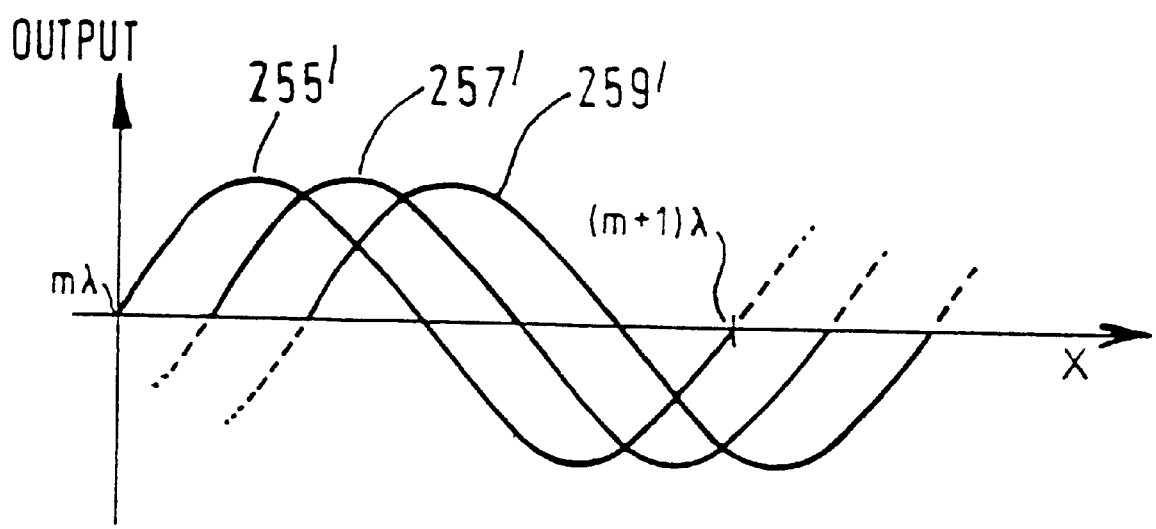
FIG. 18 illustrates the way in which signals applied to a microprocessor which forms part of the processing circuitry shown in FIG. 16, vary with the angular position of the encoder ring.

As in the first embodiment, the excitation magnetic field generated by the excitation current flowing in the excitation coil 263, interacts with the DC magnetic field of the encoder ring 3 to generate output signals in the sense coils 255, 257 and 259 which are dependent upon the angular position of the encoder ring 3. The way in which the peak amplitudes 255', 257'and 259' of these output signals 255, 257 and 259 vary with the rotation angle (x) of the encoder ring 3 is illustrated in FIG. 18. As shown, the respective peak amplitudes 255', 257' and 259' vary sinusoidally and repeat every ⅓ of a revolution of the encoder ring 3, i.e. λ in this embodiment equals 360°/3. FIG. 18 also shows that the variation of these peak amplitudes 255', 257' and 259' are 60° out of phase with respect to each other. This is because sense coil 257 is shifted by ¹⁄₁₈ of a revolution relative to sense coil 255 and sense coil 259 is shifted by ¹⁄₁₈ of a revolution relative to sense coil 257. This embodiment would, therefore, be useful for determining the angular position of a throttle valve in an engine, which only rotates through 90°.

This embodiment offers a number of advantages over the first embodiment. In particular, (i) in view of the highly symmetric nature of the sense coils 255, 257 and 259 and of the corresponding magnetic scale on the end face 251 of the encoder ring 3, the sensor head of this embodiment is relatively insensitive to both radial and axial vibrations; and (ii) since a signal is induced in each sense coil 255, 257 and 259 from each pitch of the magnetic scale on the encoder ring 3, the output signal levels are greater in this embodiment than those in the first embodiment, and the output signal from each sense coil 255, 257 and 259 will represent an average position of the encoder ring 3 within the pitch of the magnetic scale.

Figure 19A:
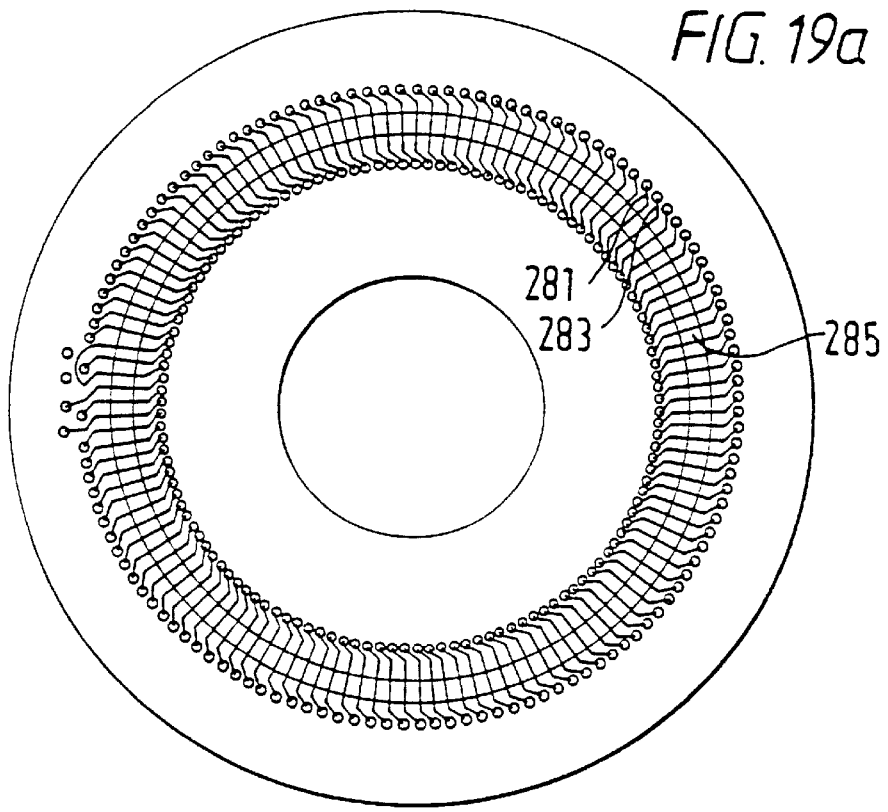
FIG. 19a shows the top layer of printed conductors of a printed circuit board which forms a sensor head according to a modification of the second embodiment.
Figure 19B:
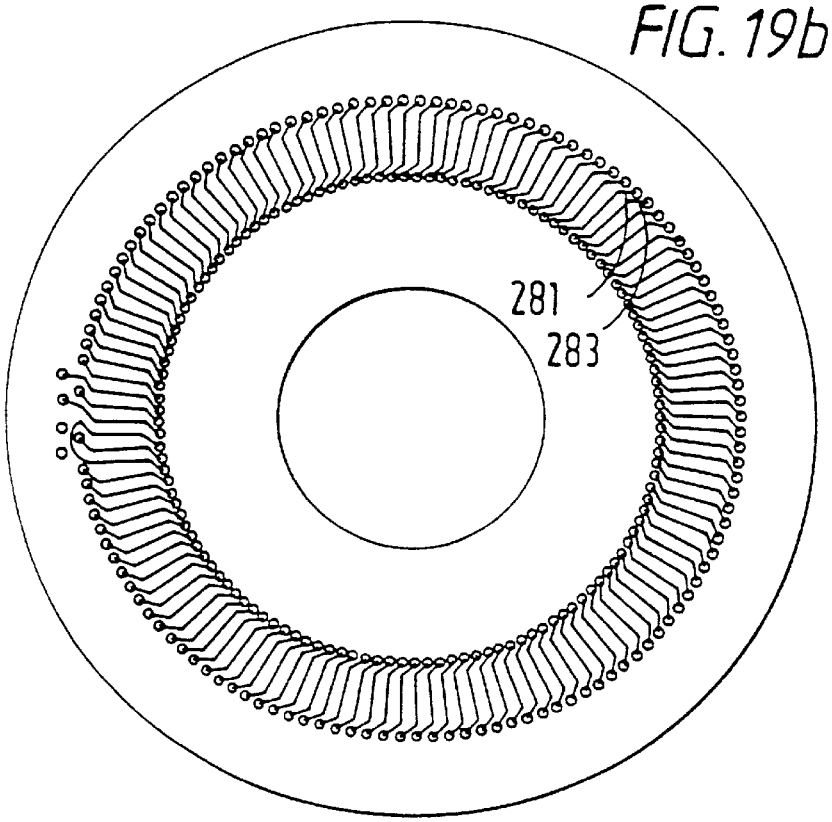
FIG. 19b shows the bottom layer of printed conductors for forming the sensor head according to the modification of the second embodiment.

FIGS. 19a and 19b illustrate the form of conductor patterns on a top and bottom layer respectively, of a printed circuit board forming part of a sensor head according to a modification of the second embodiment. In this modification, two sense coils 281 and 283 are provided, each having 64 series connected loops, with adjacent loops being wound in the opposite sense. In this embodiment, the loops have a general hexagonal shape. FIG. 19a also shows the ring 285 of saturatable magnetic material. An excitation coil (not shown) is wound in the same manner as in the second embodiment. In this modification, the magnetic pattern on the end face 251 of the encoder ring 3 has 32 N and 32 S poles arranged in a continuous alternating series at a pitch matching that of the sense coils 281 and 283.

The interaction between the magnetic field of the encoder ring 3 and the excitation magnetic field induces an EMF in each of the sense coils 281 and 283 which are in phase quadrature. The way in which these fields interact to generate these EMFs is the same as that of the first embodiment, and will not be described again. In this embodiment, the peak amplitude of the fundamental component of the EMF induced in each sense coil 281 and 283 varies sinusoidally with a period of ¹⁄₃₂ of a revolution of the encoder ring 3. The excitation and processing circuitry (not shown) used in this embodiment is the same as that used in the first embodiment. However, since a signal is induced in the sense coils 281 an and 283 from each pitch of the magnetic scale on the encoder ring 3, the output signal levels in this embodiment, are much greater than those of the first embodiment. Furthermore, the output signal from each sense coil 281 and 283 will represent an average position of the encoder ring 3 within the pitch of the magnetic scale. Therefore any defects in the manufacturing of the magnetic scale should be averaged out. This embodiment would be particularly suited for determining the angular position of a camshaft or crankshaft in a vehicle since it is robust, simple and inexpensive to manufacture, insensitive to electromagnetic interference and tolerant to mechanical misalignment and high temperatures.

FIG. 20 illustrates a further modification to the second embodiment. In particular, FIG. 20 illustrates the form of sense coils on a sensor head and the form of the magnetisation pattern on the encoder ring 3, which will provide a full 360° rotary position encoder. FIG. 20a illustrates the form of a first sense coil 301 which extends over approximately 360°. As shown, sense coil 301 is formed by an outer loop and an inner loop of conductors, each having a cross-over 303 so that the output from the sense coil inverts after the encoder ring 3 has rotated through 180°. In this embodiment, the inner loop is arranged to be wider than the outer loop to such an extent that the effective area of each is the same. This arrangement reduces the sense coils sensitivity to external electromagnetic interference. FIG. 20b illustrates the form of the second sense coil 305 which has the same form as sense coil 301, but which is rotated through a quarter of a revolution so that the output signals from sense coils 301 and 305 are in phase quadrature. FIGS. 20a and 20b also show, in phantom, the extent of the saturatable soft magnetic material.

FIG. 20c shows the form of the magnetic scale on the end face 251 of the encoder ring 3 in this modification. As represented by the different sizes of letters S and N, the strength of the magnetic N and S poles written onto end face 251 is varied in dependence upon its position around the end face 251. In particular, the magnetisation level of the magnetic scale is modulated sinusoidally circumferentially around the end face 251.

The form of the excitation coil is the same as that in the second embodiment, and the interaction between the magnetic field of the encoder ring 3 and the excitation magnetic field results in an EMF in each of the sense coils 301 and 305, the peak magnitude of which varies sinusoidally with the angular position of the encoder ring 3. However, unlike in the above embodiments, the peak magnitude of the induced EMF in this embodiment, varies through one period for every complete rotation of the encoder ring 3, i.e. $\lambda$ equals 360°. This embodiment, is therefore, suited to applications which require full 360° position encoding, such as the encoding of the position of the steering wheel, camshaft or crankshaft in a motor vehicle.

FIG. 21 schematically illustrates a linear position encoder embodying the present invention. As will become apparent from the following description, this embodiment can be used in most linear position applications, and is particularly useful in applications where the measurement range is relatively long, i.e. 10 to 30 m, for example in machine tool applications. As shown, the encoder includes a long strip of magnetisable material 311 onto which a continuous series of alternating N and S magnetic poles have been written. In this embodiment the pitch (P) of the magnetic scale, ie. the distance between adjacent like poles, is 6 mm and the surface magnetic flux density is 0.2 Tesla. The sensor head has a length L of approximately 35 mm and includes a U-shaped ferrite core 315 having an excitation coil 317 wound around it and a printed circuit board 319 carrying sense windings and a saturatable magnetic material.

FIG. 22 schematically illustrates the form of the sense windings 321 and 323 and the form of the saturatable magnetic material in this embodiment. As shown, each sense winding 321 and 323 comprises 10 loops of series connected conductors, connected such that adjacent loops are wound in the opposite sense. In this embodiment, the period $T_s$ of the sense coils 321 and 323 is equal to 6 mm which is the same as the pitch P of the magnetic scale on the magnetisable strip 311. Consequently, the signal induced in sense coil 321 and 323 will represent the average position within a pitch determined over 5 consecutive pitches of the magnetic scale. The ends of the sense coils 321 and 325 are connected to processing circuitry (not shown) by the twisted wire pairs 325 and 327. FIG. 22 also shows the stripe of saturatable magnetic material 329 which overlays, but insulated from, the sense coils 321 and 323.

As will be understood from FIG. 21, the magnetic flux caused by an excitation current flowing in the excitation coil 317 passes across the width of the saturatable material 329 rather than passing along its length, as was the case in the first embodiment. This, however, does not effect the way in which the position encoder operates. In this embodiment, the AC magnetic field interacts with the magnetic field of the scale to produce an output signal in the sense coils 321 and 323, which is dependent upon the position of the sensor head 313 relative to the magnetic scale on the magnetisable strip 311. In particular, as in the first embodiment, the peak amplitude of the EMF induced in sense coils 321 and 323 varies sinusoidally over the pitch P of the magnetic scale. Therefore, the excitation and processing circuitry of this embodiment is the same as that used in FIG. 1.

Figure 23A:
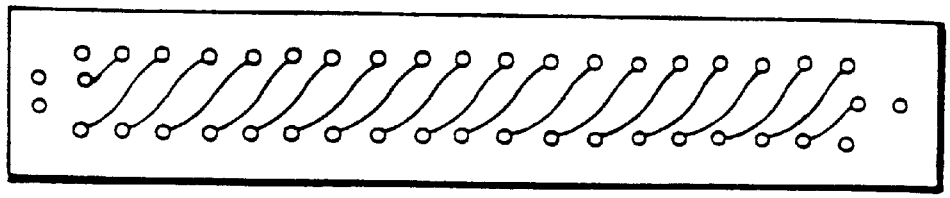
FIG. 23a shows a bottom layer of printed conductors of a printed circuit board.
Figure 23B:
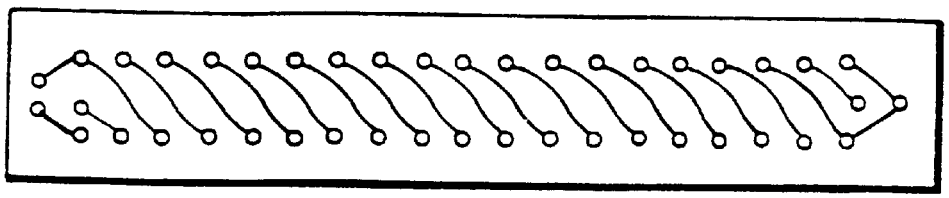
FIG. 23b shows a top layer of printed conductors of a printed circuit board.
Figure 23C:
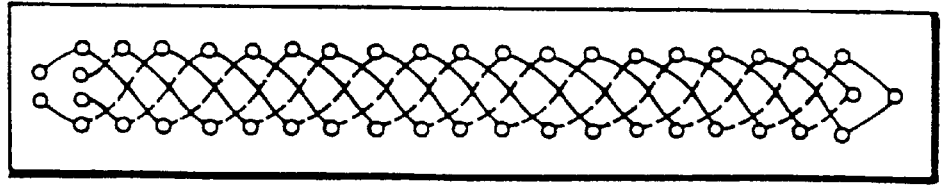
FIG. 23c shows the printed circuit board formed by the top and bottom layer of conductors shown in FIGS. 23a and 23b.

FIG. 23a illustrates a bottom layer of conductors of a printed circuit board which would form the sense coils shown schematically in FIG. 22 and FIG. 23b shows the top layer of the printed circuit board. FIG. 23c shows the resulting coil arrangement formed by the top and bottom layers of conductors shown in FIGS. 23a and 23b.

Figure 24:
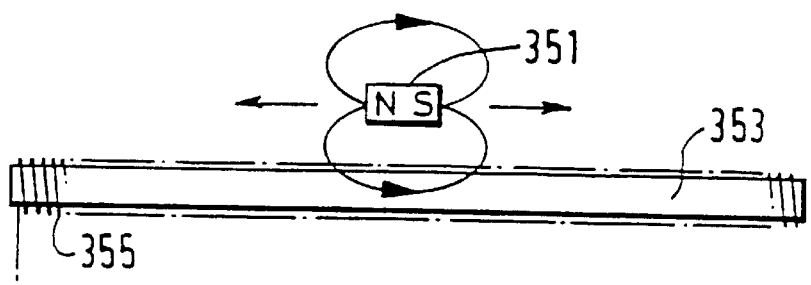
FIG. 24 schematically illustrates a second form of linear position encoder embodying the present invention.

FIG. 24 schematically illustrates the form of a linear position encoder embodying the present invention. As shown in FIG. 24, in this embodiment the movable member (not shown) has a permanent magnet 351 mounted for movement therewith. Provided adjacent the magnet, on a stationary member (not shown) is an elongate strip of soft magnetic material 353, such as grade 6025 metglass manufactured by Vacuumschmelze, Germany, having a length L of 40 cm. In this embodiment, the saturable strip 353 is 1 mm wide (the dimension into the paper) by 25 $\mu$m thick. An excitation coil 355 is wound helically around but insulated from the saturable material 353. The winding density of the excitation coil 355 is, in this embodiment, approximately 3000 turns per metre. Two sense coils (not shown) are wound over but insulated from the excitation coil 355. The sense coils are schematically shown in FIG. 25. In this embodiment, the excitation coil 355 and the two sense coils 357 and 359 are 0.315 mm diameter conductive wire.

Figure 25A:
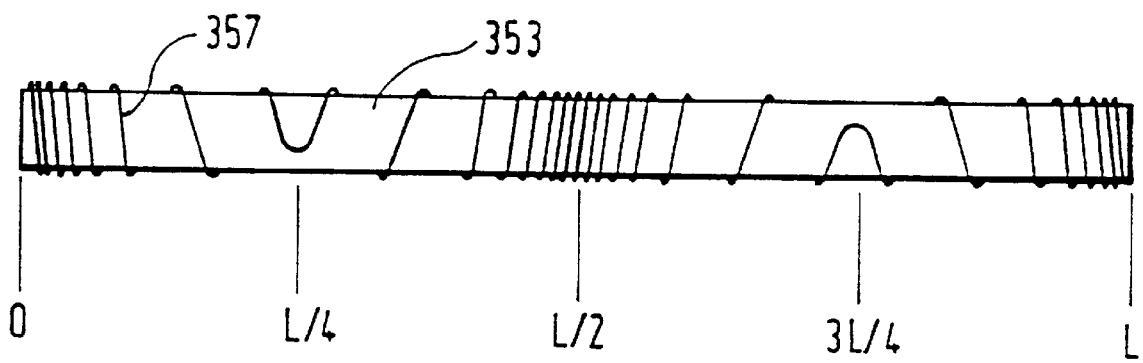
FIG. 25a schematically illustrates the way in which a first sense coil is wound around a saturable magnetic element forming part of the linear position encoder shown in FIG. 24.

FIG. 25a illustrates the way in which sense coil 357 is wound around the saturable strip 353. As shown, the winding density of sense coil 357 varies sinusoidally along the length of the saturable strip 353 and has a peak winding density of 2000 turns per metre. In particular, at the left hand edge of the saturable strip 353, the winding density of sense coil 357 is 2000 turns per metre. Moving along the length of the saturable strip 353, the winding density decreases until it reaches zero turns per meter a quarter of the way along its length where the winding direction of sense coil 357 is reversed. Moving further along the length of the saturable strip 353, the winding density increases to the maximum winding density of 2000 turns per metre half way along the saturable strip and then decreases back to zero turns per meter three quarters of the way along the saturable strip. At this point, the direction of the windings reverses again and the winding density increases back to the peak winding density of 2000 turns per metre at the right hand edge of the saturable strip 353.

Figure 25B:
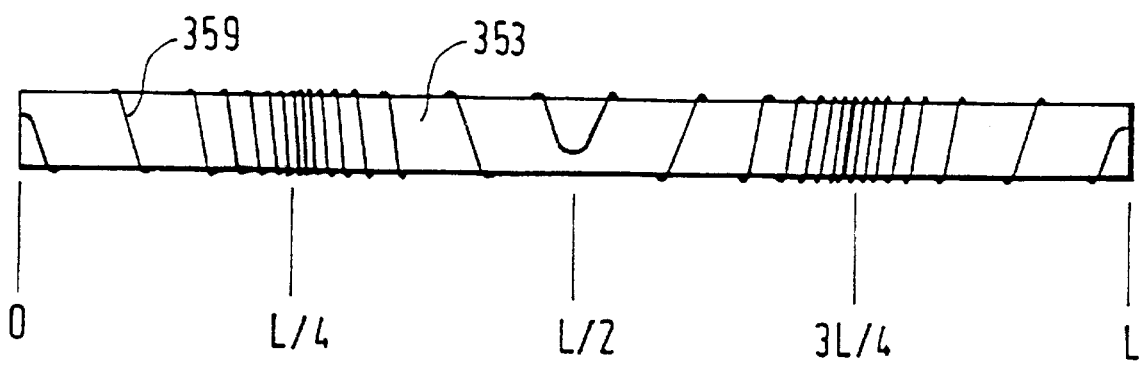
FIG. 25b schematically illustrates the way in which a second sense winding is wound around the saturable magnetic element of the linear position encoder shown in FIG. 24.

FIG. 25b illustrates the way in which sense winding 359 is wound around the strip of saturable material 353. As shown, the winding density of sense coil 359 varies sinusoidally along the length of the saturable strip 353 and has a peak winding density of 2000 turns per metre. In particular, at the left hand end of the strip 353, the winding density of sense coil 359 is zero and the winding density increases to the peak winding density of 2000 turns per metre a quarter of the way along the saturable strip and then reduces back to zero in the middle of the saturable strip 353. The sense coil 359 is then wound around the strip 353 in the other direction, increasing in winding density to a peak of 2000 turns per metre three quarters of the way along the saturable strip 353. The winding density of sense coil 359 then reduces back to zero winding density at the right hand end of the strip 353.

In operation, a DC current is applied to the excitation coil 355 which saturates the strip of saturable magnetic material 353 along its entire length except for a small portion adjacent the magnet 351. In this embodiment, the magnet 351 is designed to move relative to the strip of saturable material 353 at a separation of 25 mm and is arranged, such that at that separation, the magnetic field at the saturable strip 353 is 1500 A/m. In order to null out the effect of this field, 0.5 A of DC current is applied to the excitation coil 355. An AC current is also applied to the excitation coil 355, having a rms value of 0.1 amps and a frequency of 5 kHz. This AC excitation signal causes the part of the saturable material 353 which is not saturated by the DC current (i.e. the portion adjacent the magnet 351) to cyclically saturate and desaturate. This cyclic saturation and desaturation of that region generates high order harmonics of the AC excitation frequency, which are detected by the sense coils 357 and 359. Further, since the winding density of the sense coils 357 and 359 varies with position along the saturable material 353, the peak amplitude of the EMF induced in these sense coils will also vary with position along the saturable material 353.

Figure 26:
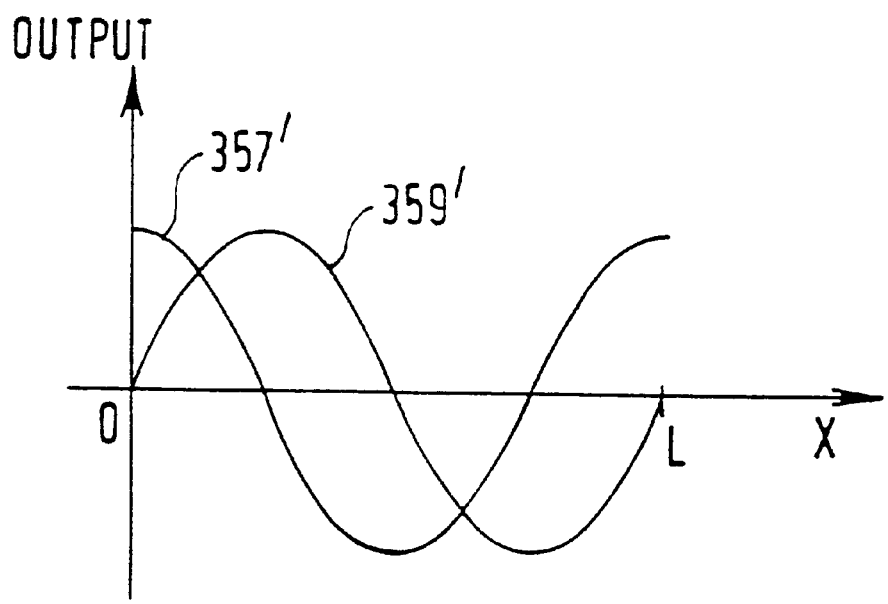
FIG. 26 schematically illustrates the way in which the amplitude of a signal induced in the sense coils shown in FIG. 25 varies in response to the motion of a movable member forming part of the position encoder shown in FIG. 24.

FIG. 26 illustrates the way in which the peak amplitudes 357' and 359' of the signals output from sense coils 357 and 359 vary with the position of the magnet 351 along the length of the saturable magnetic material 353. As shown in FIG. 26, when the magnet 352 is adjacent the left hand end (represented by the origin in FIG. 26), the peak amplitude 357' of the signal induced in sense coil 357 is at a maximum and the peak amplitude 359' of the signal induced in sense coil 359 is zero. As the magnet 351 moves along the length of the saturable strip 353, the peak amplitude 357' varies in dependence upon the cosine of the distance from the left hand edge of the strip 353, and peak amplitude 359' varies in dependence upon the sine of the distance from the left hand edge of the strip 353. Therefore, by suitable processing of the signals induced in the sense coils 357 and 359, the position of the magnet 351 relative to the strip of saturable material 353 can be determined.

This embodiment is useful for many applications, such as in a fluid level sensor, where the moving magnet can take the form of a ring around a rod containing the saturable strip 353, the excitation coil 355 and the sense coils 357 and 359. The saturable strip 353 and the coils may be contained in a non-magnetic stainless steel tube, for instance, without degrading the performance of the system. The magnetic ring should be magnetized with north on the top and south on the bottom or vice versa. This arrangement generates a relatively uniform axial magnetic field in the centre of the ring, which allows a simple electronic circuit to be used with a fixed DC current level being applied to the excitation coil 355, without having to adjust the DC current level to match the excitation DC magnetic field with the DC magnetic field from the ring due to gap variations.

Another application of this embodiment is in a variable section fluid flow meter. Traditionally, these meters use a float which moves up and down inside a glass tube having a variable cross section. The higher the flow rate, the higher the float goes up the tube. By incorporating a magnet into the float and by using the arrangement of sense and excitation coils and saturable magnetic strip shown in FIG. 24, along the length of the glass tube, the height of the float within the tube can be determined.

Figure 27:
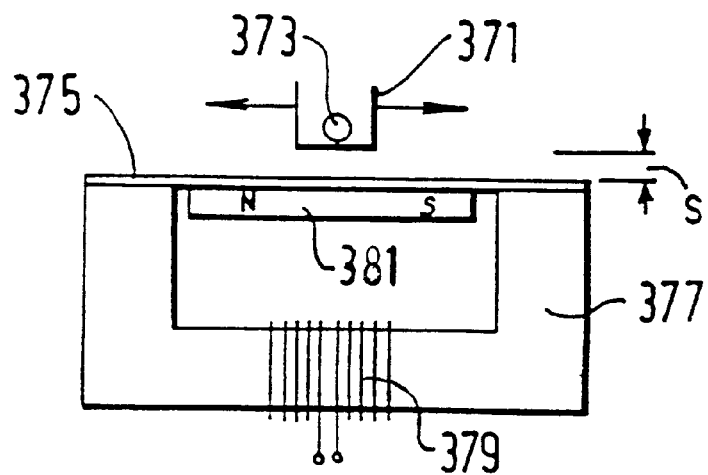
FIG. 27 schematically illustrates a simplified embodiment of the present invention.

FIG. 27 schematically illustrates a simplified position encoder embodying the present invention. As shown in FIG. 27, the encoder comprises a movable member 371 carrying a sense conductor 373 (shown in cross-section), the ends of which are connected to processing circuitry (not shown). Also shown in FIG. 27 is a saturable magnetic element 375 provided adjacent (at a distance S) from the movable member 371. The saturable material 375 is placed over the ends of a U-shaped ferrite core 377 which has an excitation coil 379 wound around it. Located below the saturable material 375 and between the upstanding limbs of the U-shaped core 377, is a permanent magnet 381.

The operation of this embodiment is similar to the operation of the previous embodiments. In particular, an AC magnetic field generated by a current flowing in the excitation coil 379 interacts with the DC magnetic field from the permanent magnet 381, resulting in different portions of the saturable material 375 being driven into and out of saturation at different times. Consequently, the amount of magnetic flux which is expelled from the material 375 and which couples with the conductor 373 varies in dependence upon the position of the conductor 373 relative to the N and S poles of the permanent magnet 381. Therefore, by suitable processing of the signal induced in the sense conductor 373, the position of the movable member 371 relative to a reference point on the saturable material 375 can be determined.

As will be apparent to those skilled in the art, the position encoders described above have several advantageous aspects over the prior art position encoders. In particular:

(i) since the active sensing element is a saturatable magnetic material, it can be used as the front surface of the sensor head without further packaging—this results in maximum signal for a given separation between the sensor head and the magnetic scale;

(ii) in view of the figure of eight shape of the sense coils, any field expelled uniformly along the saturatable material and any slowly varying fields (for example the earths magnetic field and fields from nearby magnets) do not couple with the sense coils;

(iii) the pitch of the sense coils is chosen to match the pitch of the magnetic scale on the encoder ring, resulting in maximum coupling with the leaked flux due to the magnetic scale;

(iv) the sensor has a very low DC offset resulting from the use of the saturatable magnetic material, which has a well defined and simply controlled zero field reference which is halfway between the positive and negative saturation field levels;

(v) the in-phase and quadrature phase sense coils are integrated into a single package making the sensor cheaper to install since only one package needs to be mounted and aligned relative to the rotating member and making the sensor more robust to vibrations and any errors in the concentricity of the encoder ring (since the separation between the sensor head and the encoder ring will be the same for both sense coils);

(vi) since the sense coils can be accurately designed using computer aided design, their position and spacing can be accurately matched to the pitch of the magnetic scale; and (vii) since the DC magnetic field from the magnetic scale can pass through non-magnetic metals, such as aluminium, it can be covered by a protective layer of non-magnetic material.

In view of advantages (i), (iii) and (iv) above, the sensor of the above embodiments is capable of being made more sensitive than the prior art magnetic field sensors and can therefore operate at lower absolute field levels. The field strength of the magnetic scale can therefore have lower field levels for a required performance. This is particularly advantageous in applications where there are likely to be high levels of ferromagnetic contaminants, for example, in machine tool applications where there will be significant levels of magnetic swarf since the magnetic scale can have a lower level of magnetisation reducing the attraction force (which is proportional to the square of the magnetic field) of the scale to the swarf.

Although a number of embodiments have been described, other embodiments and modifications will be apparent to those skilled in the art. For example, although each sense coil comprises at least two loops wound in a figure of 8 configuration, it will be apparent from a consideration of the magnetic field lines in FIG. 5 that the sensor will still work if the sense coils only comprise a single conductor lying across the saturable material 23. In such an embodiment, however, the sensor would no longer be insensitive to background electromagnetic interference.

Although in some of the above embodiments, the saturatable magnetic material formed the outer surface of the sensor head and the sense coils were located under the saturatable material, it will be apparent to those skilled in the art that the sense coils could be placed on top of the saturatable material instead of or in addition to placing them underneath the saturatable material.

Although in the above embodiments, a separate amplifier, mixer, LPF and comparator have been provided for processing the signal from each sense coil, a single amplifier, mixer, LPF and comparator could be used to process the different signals from the sense coils in a time multiplexed manner.

In the above embodiments, the magnetic field has been written onto a magnetisable strip or onto a magnetisable portion of the encoder ring, it would be possible, however, to form the magnetic scale using conductors and by applying a DC current thereto. Additionally, in such modification, it would also be possible to use an AC current in the conductors resulting in a magnetic scale which changes with time. Provided the frequency of this AC signal is significantly less than the frequency of the excitation current applied to the sensor head, then the same processing electronics could be used. If on the other hand, the frequency of the current applied to the conductors forming the magnetic scale is comparable to that of the excitation current applied to the sensor head, then the processing electronics would have to be modified to detect an intermodulation component which would carry the desired positional information.

Although in the above embodiments the saturatable magnetic material has been located with the sense coil, it could be mounted with the scale. For example, in the linear position encoder the saturatable material could be placed over the magnetic scale and the movable member would only carry the sense coils.

In the above embodiments, a saturable soft magnetic material has been used. A soft magnetic material is one which (a) has a narrow hysteresis; (b) has a low coercivity; and (c) has a high saturation flux density. Features (a) and (b) means that the permeability of the material is high, typically greater than 103. The coercivity of the soft magnetic material is typically less than 100 A/m. Although a soft magnetic material is preferred, any magnetic element which is saturable may be used. Indeed, the saturable element could be made from a layer of printed ferrite ink formed on an aluminium oxide substrate.

In the above embodiments, the excitation and processing circuitry used detects and measures the amplitude of the fundamental component of the EMF induced in each sense coil. The frequency of this fundamental is twice that of the excitation current. In an alternative embodiment, the signals output by the respective low pass filters could be used to control a current generator which feeds a current into, for example, the sense coils, which generates an appropriate signals for cancelling out the fundamental component in the respective sense coils. This feedback arrangement:, results in improved system linearity and dynamic range.

Although the amplitude of a signal induced in the sense coils was used to determine the relative position between the sensor head and the moving member, the relative position can also be determined by monitoring the time at which the signal is generated in each of the sense conductors. The way in which the processing electronics would be adapted for such an embodiment will be apparent to those skilled in the art and will not be described here.

What is claimed is:

1. An apparatus for generating a signal indicative of the relative position of first and second relatively movable members in a measurement direction, said apparatus comprising:

means carried by one of said members, for generating a magnetic field whose strength varies with position in the measurement direction;

a saturable magnetic element located, in use, within said positionally varying magnetic field;

drive means for generating a magnetic field which varies with time and which, in use, interacts with said positionally varying magnetic field to cause at least one portion but not all of the element to saturate and/or unsaturate with variation of the time varying magnetic field; and at least one sense conductor carried on the other one of said members for sensing a magnetic field generated by said at least one portion as it is driven into and/or out of saturation with the time varying magnetic field and for outputting a signal which varies in dependence upon the sensed magnetic field and upon the relative position of said sense conductor and said at least one portion:

wherein the arrangement is such that relative movement of said first and second members causes a relative movement between said at least one portion and said at least one sense conductor. whereby said signal output by said sense conductor varies in dependence upon the relative position of said first and second members.

2. An apparatus as in claim 1, wherein a plurality of sense conductors are carried on said other member, which are spaced apart in said measurement direction such that, in use, as the at least one portion is driven into and/or out of saturation, each sense conductor outputs a signal which is dependent upon the relative position between the sense conductor and said at least one portion.

3. An apparatus as in claim 2, wherein the strength of said positionally varying magnetic field varies in an alternating fashion with position in said measurement direction.

4. An apparatus as in claim 3, wherein each sense conductor comprises at least two loops of conductor connected in series in a figure of eight arrangement and arranged such that adjacent loops of a sense conductor are sensitive to adjacent half cycles of said positionally varying magnetic field.

5. An apparatus as in claim 1, wherein the peak amplitude of the signal output by each sense conductor is dependent upon the relative position of the sense conductor and said at least one portion.

6. An apparatus as in claim 5, wherein said peak amplitude of the signal output by each sense coil varies sinusoidally in dependence upon the relative position of the sense conductor and said at least one portion.

7. An apparatus as in claim 6, wherein two sense conductors are provided which are spaced apart in the measurement direction such that the output signals therefrom are in phase quadrature.

8. An apparatus as in claim 6, wherein three sense conductors are provided which are spaced apart in said measurement direction such that the output signals therefrom are 600 out of phase.

9. An apparatus as in claim 4, wherein said saturable magnetic element lies in a plane, and wherein the loops of each sense conductor lie in one or more planes which are substantially parallel to the plane of said magnetic element.

10. An apparatus as in claim 4, wherein said saturable magnetic element lies in a plane, and wherein the loops of said sense conductor lie in planes which are substantially orthogonal to the plane of said magnetic element.

11. An apparatus as in claim 4, wherein each sense conductor is wound around the saturable element in a plurality of turns which extend in the measurement direction and wherein the winding density of each sense conductor varies with position in the measurement direction.

12. An apparatus as in claim 11, wherein the winding density of each sense conductor varies sinusoidally with position in the measurement direction.

13. An apparatus as in claim 4, wherein the loops of each sense conductor comprise a plurality of turns of conductor.

14. An apparatus as in claim 4, wherein the loops of each sense conductor are generally rectangular.

15. An apparatus as in claim 4, wherein the loops of each sense conductor are generally hexagonal.

16. An apparatus as in claim 4, wherein the loops of each sense conductor are elliptical.

17. An apparatus as in claim 16 wherein each sense conductor is provided adjacent to a different portion of the magnetic element and is sensitive to the magnetic condition of the respective portion.

18. An apparatus as in claim 1, wherein each sense conductor is formed on a printed circuit board.

19. An apparatus as in claim 1, wherein each sense conductor is formed as a thick film of conductor on a ceramic substrate.

20. An apparatus as in claim 1, wherein each sense conductor is formed as a thin film of conductor on a semiconductor substrate.

21. An apparatus as in claim 1, wherein said means for generating a magnetic field whose strength varies with position comprises a magnetic scale having at least one north and at least one south magnetic pole.

22. An apparatus as in claim 21, wherein the magnetic scale comprises a continuous series of alternating north and south magnetic poles.

23. An apparatus as in claim 22, which is a rotary position encoder, wherein said member which carries said magnetic scale is generally cylindrical and wherein the continuous series of alternating north and south magnetic poles are formed in a circumferential edge of said member.

24. An apparatus as in claim 22, which is a rotary position encoder, wherein the continuous series of alternating north and south magnetic poles are formed in a circular ring on an end side of the member.

25. An apparatus as in claim 1, wherein the pitch of the magnetic scale is greater than 0.5 mm.

26. An apparatus as in claim 25, wherein the pitch of the magnetic scale is approximately 6 mm and the magnetic flux density at the surface of the scale is approximately 0.2 Tesla.

27. An apparatus as in claim 1, wherein said saturable magnetic element has a high permeability and a low coercivity.

28. An apparatus as in claim 27, wherein said saturable magnetic element has a permeability which is greater than $10^3$ and a coercivity not more than 100 A/m.

29. An apparatus as in claim 27, wherein said saturable magnetic element comprises a spin melt ribbon.

30. An apparatus as in claim 27, wherein said saturable magnetic element comprises a printed ferrite ink on an aluminium oxide.

31. An apparatus as in claim 1, wherein said saturable magnetic element is an elongate strip whose major axis extends in the measurement direction.

32. An apparatus as in claim 1, wherein said saturable magnetic element is formed into a circular ring.

33. An apparatus as in claim 1, wherein said saturable magnetic element is placed across the open end of a ferrite core, and wherein said drive means comprises a coil wound around said ferrite core.

34. An apparatus as in claim 33, wherein said ferrite core is formed from a layer of ferrite ink which is printed onto an aluminium oxide substrate.

35. An apparatus as in claim 31, wherein said drive means comprises a coil which is helically wound along the length of said elongate saturable magnetic element.

36. An apparatus as in claim 1, wherein the direction of the time varying magnetic field in said element is the same as the measurement direction.

37. An apparatus as in claim 1, wherein the direction of the time varying magnetic field in said element is substantially orthogonal to the measurement direction.

38. An apparatus as in claim 2, wherein said magnetic element is carried by the same member which carries each sense conductor.

39. An apparatus as in claim 38, wherein each sense conductor is provided adjacent to a side of the magnetic element and wherein the other side is adjacent to said means for generating the positionally varying magnetic field.

40. An apparatus as in claim 1, wherein said drive means is carried by the member which carries each sense conductor.

41. An apparatus as in claim 40 wherein:
said magnetic element is carried by the same member which carries said at least one sense conductor;
said drive means is provided on one side of the magnetic element, and
the other side of the magnetic element is adjacent said means for generating the positionally varying magnetic field.

42. An apparatus as in claim 1, wherein said drive means comprises an excitation coil and means for exciting said excitation coil with a cyclically varying excitation signal.

43. An apparatus as in claim 42, wherein said excitation means excites said excitation coil with an AC current.

44. An apparatus as in claim 1, wherein said member which carries said means for generating the positionally varying magnetic field, is movable.

45. An apparatus as in claim 1, wherein said member which carries each sense conductor is movable.

46. An apparatus as in claim 1, which is a linear position encoder.

47. An apparatus as in claim 1, which is a rotational position encoder.

48. An apparatus as in claim 47, wherein each sense conductor comprises an inner loop and an outer loop of conductor connected in series and wherein each loop is generally ring like.

49. An apparatus as in claim 48, wherein the loops of each sense conductor have a cross over midway around the extent of the loop.

50. An apparatus as in claim 49, wherein said means for generating said positionally varying magnetic field is a magnetic scale formed circumferentially around an end face of the member, about the axis of rotation.

51. An apparatus as in claim 50, wherein said magnetic scale comprises a series of magnetic north and magnetic south poles whose strength is varied sinusoidally circumferentially around said axis.

52. An apparatus as in claim 47, when used in an encoder for determining the position of a bearing whose diameter is greater than 20 mm.

53. An apparatus as in claim 1, further comprising processing means for processing the signal from each sense conductor to output a value indicative of the relative position of said first and second members, and/or the speed at which said first and second members move relative to each other, and/or the direction in which said first and second members are moving relative to each other, and/or the acceleration of the first and second members relative to each other.

54. An apparatus as in claim 53, wherein said processing means comprises feedback means arranged to cancel out the signal induced in each sense conductor, and wherein the relative position of said first and second members, and/or the speed at which said first and second members move relative to each other, and/or the direction in which said first and second members are moving relative to one another, and/or the acceleration of the first and second members relative to each other is determined from the signal applied to said feedback means.

55. An apparatus for generating a signal indicative of the relative position of first and second relatively movable members in a measurement direction, comprising:

means carried by one of said members, for generating a magnetic field whose strength alternates in sense with position in the measurement direction;

a saturable magnetic element located, in use, within said positionally varying magnetic field;

drive means for generating a magnetic field which varies with time and which, in use, interacts with said positionally varying magnetic field to cause at least one portion but not all of the element to saturate and/or unsaturate with variation of the time varying magnetic field; and at least one sense conductor carried on the other one of said members for sensing a magnetic field generated by said at least one portion as it is driven into and/or out of saturation with the time varying magnetic field and for outputting a signal which varies in dependence upon the sensed magnetic field and upon the relative position of said sense conductor and said at least one portion;

wherein the arrangement is such that relative movement of said first and second members causes a relative movement between said at least one portion and said at least one sense conductor, whereby said signal output by said sense conductor varies in dependence upon the relative position of said first and second members.

56. An apparatus for generating a signal indicative of the relative position of first and second relatively movable members, comprising:

means carried by one of said members, for generating a magnetic field whose strength varies with position in the measurement direction;

a saturable magnetic element located, in use, within said positionally varying magnetic field;

drive means for generating a magnetic field which varies with time and which, in use, interacts with said positionally varying magnetic field to cause at least one portion but not all of the element to saturate and/or unsaturate with variation of the time varying magnetic field; and at least one sense conductor carried on the other one of said members for sensing a magnetic field generated by said at least one portion as it is driven into and/or out of saturation with the time varying magnetic field and for outputting a signal which varies in dependence upon the sensed magnetic field and upon the relative position of said sense conductor and said at least one portion;

wherein the arrangement is such that relative movement of said first and second members causes a relative movement between said at least one portion and said at least one sense conductor, whereby said signal output by said sense conductor varies in dependence upon the relative position of said first and second members.

57. A method of determining the relative position of first and second members, comprising the steps of:

providing an apparatus according to claim 1;

causing said drive means to generate said magnetic field which varies with time; and detecting the output signal in said sense conductor, and deriving therefrom the relative position of said first and second members.

58. An apparatus as in claim 1, wherein said drive means is operable to generate a periodically varying magnetic field and further comprising:

processing means for processing the signal output by said sense conductor to determine the relative position of said first and second members, and wherein said processing circuitry includes a mixer which is operable to mix the signal output by said sense conductor with a periodic time varying signal whose periodicity is half that of the magnetic field generated by said drive means.

59. An apparatus as in claim 1, wherein said drive means is operable to generate an AC magnetic field, having a fundamental frequency F and wherein the magnetic field generated by said at least one portion of the magnetic element has a fundamental frequency of 2 F.

60. An apparatus for generating a signal indicative of the relative position of first and second relatively movable members in a measurement direction, the apparatus comprising:

a first magnetic field generator, carried by one of said members, for generating a magnetic field whose strength varies with position in the measurement direction;

a saturable magnetic element located, in use, within said positionally varying magnetic field;

a second magnetic field generator for generating a magnetic field which varies with time and which, in use, interacts with said positionally varying magnetic field to cause at least one portion but not all of the element to saturate and/or unsaturate with the variation of the time varying magnetic field; and at least one sense conductor carried on the other one of said members for sensing a magnetic field generated by said at least one portion as it is driven into and/or out of saturation with the time varying magnetic field and for outputting a signal which varies in dependence upon the sensed magnetic field and upon the relative position of said sense conductor and said at least one portion; and wherein the arrangement is such that relative movement of said first and second members causes a relative movement between said at least one portion and said at least one sense conductor, whereby said signal output by said sense conductor varies in dependence upon the relative position of said first and second members.

61. An apparatus for generating a signal indicative of the relative position of first and second relatively movable members in a measurement direction, the apparatus comprising:

a first magnetic field generator, carried by one of said members, for generating a magnetic field whose strength varies in an alternating fashion with position in said measurement direction;

a saturable magnetic element located, in use, within said positionally varying magnetic field;

a second magnetic field generator for generating a magnetic field which varies with time and which, in use, interacts with said positionally varying magnetic field to cause at least one portion but not all of the element to saturate and/or unsaturate with the variation of the time varying magnetic field; and at least one sense conductor carried on the other one of said members for sensing a magnetic field generated by said at least one portion as it is driven into and/or out of saturation and for outputting a signal which varies in dependence upon the sensed magnetic field and upon the relative position of said sense conductor and said at least one portion; and wherein the arrangement is such that relative movement of said first and second members causes a relative movement between said at least one portion and said at least one sense conductor, whereby said signal output by said sense conductor varies in dependence upon the relative position of said first and second members.

* * * * *